US011014241B2

United States Patent
Islam et al.

(10) Patent No.: US 11,014,241 B2
(45) Date of Patent: *May 25, 2021

(54) METHOD AND CONTROL SYSTEM FOR VERIFYING AND UPDATING CAMERA CALIBRATION FOR ROBOT CONTROL

(71) Applicant: MUJIN, INC., Tokyo (JP)

(72) Inventors: Russell Islam, Tokyo (JP); Xutao Ye, Tokyo (JP); Rosen Diankov, Tokyo (JP)

(73) Assignee: Mujin, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,832

(22) Filed: Jan. 2, 2020

(65) Prior Publication Data

US 2020/0306975 A1    Oct. 1, 2020

Related U.S. Application Data

(63) Continuation of application No. 16/525,004, filed on Jul. 29, 2019, now Pat. No. 10,562,186, which is a (Continued)

(51) Int. Cl.
    *B25J 9/16*    (2006.01)
    *G06T 7/80*    (2017.01)

(52) U.S. Cl.
    CPC .......... *B25J 9/1692* (2013.01); *B25J 9/1697* (2013.01); *G06T 7/80* (2017.01); *G05B 2219/39008* (2013.01); *G06T 2207/30164* (2013.01)

(58) Field of Classification Search
    CPC ......... B25J 9/1692; B25J 9/1697; G06T 7/80; G06T 2207/30164
    (Continued)

(56) References Cited

U.S. PATENT DOCUMENTS 5,297,238 A * 3/1994 Wang ............... B25J 9/1692
                                                700/254
7,015,418 B2    3/2006 Cahill et al.
(Continued)

FOREIGN PATENT DOCUMENTS

CN    1598610 A    3/2005
CN    103538061 A    1/2014
(Continued)

OTHER PUBLICATIONS

Any information that are not included with this Information Disclosure Statement can be found in U.S. Appl. Nos. 16/369,630 and 16/525,044, to which this application claims priority.
(Continued)

*Primary Examiner* — Jaime Figueroa
(74) *Attorney, Agent, or Firm* — Medler Ferro Woodhouse & Mills PLLC

(57) ABSTRACT

A robot control system and a method for camera calibration verification is presented. The robot control system is configured to perform a first camera calibration, and to control a robot arm to move a verification symbol to a reference location. The robot control system further receives, from a camera, a reference image of the verification symbol, and determines a reference image coordinate for the verification symbol. The robot control system further controls the robot arm to move the verification symbol to the reference location again during an idle period, receives an additional image of the verification symbol, and determines a verification image coordinate. The robot control system determines a deviation parameter value based the reference image coordinate and the verification image coordinate, and whether the deviation parameter value exceeds a defined threshold, and performs a second camera calibration if the threshold is exceeded.

20 Claims, 16 Drawing Sheets

Related U.S. Application Data continuation of application No. 16/369,630, filed on Mar. 29, 2019, now Pat. No. 10,399,227.

(58) Field of Classification Search
USPC .......................................................... 700/245
See application file for complete search history.

(56) References Cited

U.S. PATENT DOCUMENTS

| | | |
|---|---|---|
| 9,916,506 B1 | 3/2018 | Davis |
| 10,052,766 B2 | 8/2018 | Shirakyan et al. |
| 10,095,555 B2 | 10/2018 | Koyanagi et al. |
| 10,350,755 B2 | 7/2019 | Wagner et al. |
| 10,369,698 B1 | 8/2019 | Islam et al. |
| 2005/0166413 A1 | 8/2005 | Crampton |
| 2008/0004750 A1 | 1/2008 | Ban et al. |
| 2010/0232681 A1 | 9/2010 | Fujieda et al. |
| 2011/0282492 A1 | 11/2011 | Krause et al. |
| 2012/0203490 A1 | 8/2012 | Sayeh et al. |
| 2012/0327214 A1 | 12/2012 | McEntyre et al. |
| 2013/0010081 A1 | 1/2013 | Tenney et al. |
| 2013/0345875 A1 | 12/2013 | Brooks et al. |
| 2015/0025683 A1 | 1/2015 | Amano |
| 2016/0075015 A1 | 3/2016 | Izhikevich et al. |
| 2016/0292882 A1 | 10/2016 | Comport et al. |
| 2017/0032529 A1 | 2/2017 | De Villiers et al. |
| 2017/0043477 A1 | 2/2017 | Kitayama et al. |
| 2018/0089831 A1 | 3/2018 | Liu et al. |
| 2018/0272535 A1 | 9/2018 | Ogawa et al. |
| 2018/0300900 A1* | 10/2018 | Wakai ...................... G06T 7/80 |
| 2018/0300901 A1* | 10/2018 | Wakai ...................... G06T 7/73 |
| 2018/0304466 A1 | 10/2018 | Machino et al. |
| 2018/0309978 A1 | 10/2018 | Nobori et al. |
| 2018/0316905 A1* | 11/2018 | Nobori ...................... B60R 1/00 |
| 2018/0316906 A1 | 11/2018 | Nobori et al. |
| 2018/0339174 A1 | 11/2018 | Kilby et al. |
| 2018/0339456 A1 | 11/2018 | Czinger et al. |
| 2018/0350100 A1 | 12/2018 | Hanson et al. |
| 2018/0354130 A1 | 12/2018 | Preisinger et al. |
| 2019/0105781 A1 | 1/2019 | Nobori et al. |
| 2019/0071261 A1 | 3/2019 | Wertenberger |
| 2019/0092179 A1 | 3/2019 | Kwa et al. |
| 2019/0154850 A1 | 5/2019 | Nishihara et al. |
| 2019/0156478 A1 | 5/2019 | Berlinger et al. |
| 2019/0182415 A1 | 6/2019 | Sivan |
| 2019/0205641 A1* | 7/2019 | Ernst ........................ G06T 7/13 |
| 2019/0239716 A1 | 8/2019 | Choi et al. |
| 2019/0244375 A1 | 8/2019 | Choi et al. |
| 2019/0291277 A1 | 9/2019 | Oleynik |
| 2020/0027241 A1* | 1/2020 | Tong ...................... H04N 5/232 |

FOREIGN PATENT DOCUMENTS

| | | |
|---|---|---|
| CN | 106000904 A | 10/2016 |
| CN | 106965180 A | 7/2017 |
| CN | 107851304 A | 3/2018 |
| CN | 108621125 A | 10/2018 |
| CN | 110103219 A | 8/2019 |
| CN | 110193832 A | 9/2019 |
| CN | 110253629 A1 | 9/2019 |
| DE | 11 2011 101 730 B4 | 3/2016 |
| DE | 10 2017 217 142 A1 | 3/2018 |
| DE | 10 2018 200 154 A1 | 7/2018 |
| EP | 2921267 A2 | 9/2015 |
| JP | 63-163907 A | 7/1988 |
| JP | 02-183102 A | 7/1990 |
| JP | 04-60817 A | 2/1992 |
| JP | 05-11822 A | 1/1993 |
| JP | 05-301195 A | 11/1993 |
| JP | 2014-014912 A | 1/2014 |
| JP | 2014-149142 A | 8/2014 |
| JP | 2016-078195 A | 5/2016 |
| JP | 2017-033247 A | 2/2017 |
| JP | 2018-001333 A | 1/2018 |
| JP | 2018-158391 A | 10/2018 |
| JP | 2019-000923 A | 1/2019 |
| WO | 2018/163450 A1 | 1/2018 |
| WO | 2017033247 A1 | 3/2018 |

OTHER PUBLICATIONS

Notification of Reason for Refusal issued in Japanese Application No. 2019-126578, dated Nov. 19, 2019.
Office Action dated Sep. 9, 2020, in German Patent Appln No. 10 2020 106 973.1 (with English language translation).
Office Action dated Aug. 10, 2020, in Chinese Patent Appln No. 202010044652.0 (with English language translation).
Office Action dated Aug. 25, 2020, in Japanese Patent Appln No. 2020-120957 (with English language translation).
Notice of Allowance in U.S. Appl. No. 16/864,071 dated Sep. 30, 2020.
Office Action dated Jan. 13, 2021, in Chinese Application No. 202010831931.1.

* cited by examiner

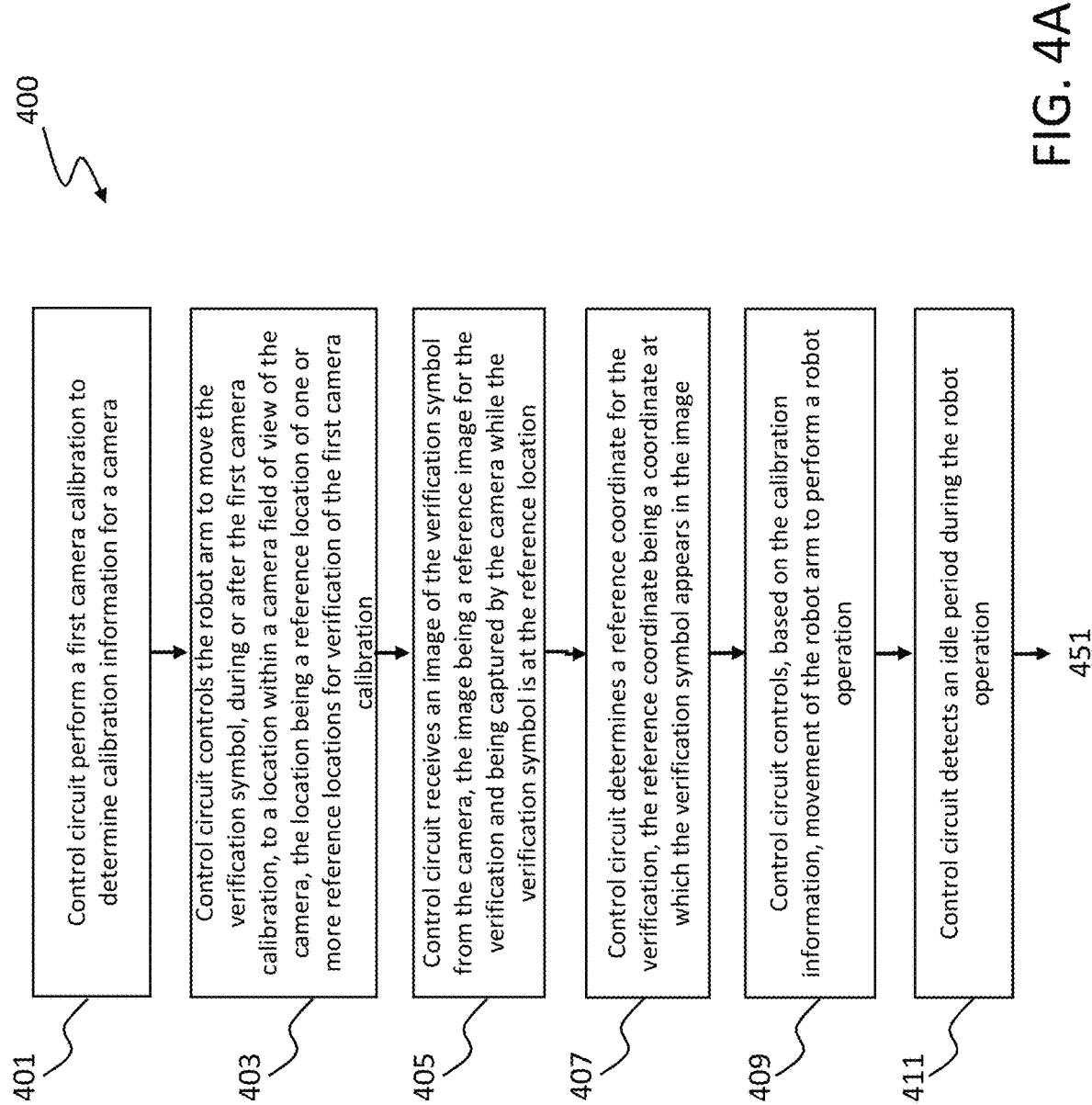

_US 11,014,241 B2_

METHOD AND CONTROL SYSTEM FOR VERIFYING AND UPDATING CAMERA CALIBRATION FOR ROBOT CONTROL

CROSS-REFERENCE TO RELATED APPLICATION(S)

This application is a continuation of U.S. application Ser. No. 16/525,004, entitled "METHOD AND CONTROL SYSTEM FOR VERIFYING AND UPDATING CAMERA CALIBRATION FOR ROBOT CONTROL" and filed on Jul. 29, 2019, which is a continuation of U.S. application Ser. No. 16/369,630, entitled "METHOD AND CONTROL SYSTEM FOR VERIFYING AND UPDATING CAMERA CALIBRATION FOR ROBOT CONTROL" and filed on Mar. 29, 2019, the disclosures of which are expressly incorporated by reference herein in their entirety.

FIELD OF THE INVENTION

The present invention is directed to a method and control system for verifying and updating camera calibration for robot control.

BACKGROUND

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as an image taken by a camera in the warehouse or factory. In the latter situation, calibration may be performed so as to determine a property of the camera, and to determine a relationship between the camera and an environment in which the robot is located. The calibration may be referred to as camera calibration, and may generate camera calibration information that is used to control the robot based on images captured by the camera. In some implementations, the camera calibration may involve manual operation by a person, who may manually control movement of the robot, or manually control the camera to capture an image of the robot.

SUMMARY

One aspect of the embodiments herein relates to performing camera calibration verification for robot control. The camera calibration verification may be performed by a robot control system that comprises a communication interface and a control circuit. The communication interface may be configured to communicate with a robot having a base and a robot arm with a verification symbol disposed thereon, and to communicate with a camera having a camera field of view. The control circuit of the robot control system may be configured to perform the camera calibration verification by: a) performing a first camera calibration to determine camera calibration information, b) outputting a first movement command to the communication interface, wherein the communication interface is configured to communicate the first movement command to the robot to cause the robot arm to move the verification symbol, during or after the first camera calibration, to a location within the camera field of view, the location being a reference location of one or more reference locations for verification of the first camera calibration, c) receiving an image of the verification symbol via the communication interface from the camera, which is configured to capture the image of the verification symbol at the reference location, the image being a reference image for the verification, d) determining a reference image coordinate for the verification symbol, the reference image coordinate being a coordinate at which the verification symbol appears in the reference image, and e) outputting a second movement command that is based on the camera calibration information to the communication interface, wherein the communication interface is configured to communicate the second movement command to the robot to cause movement of the robot arm to perform a robot operation.

In an embodiment, the control circuit is configured to perform the camera calibration verification further by: f) detecting an idle period during the robot operation, g) outputting a third movement command to the communication interface, wherein the communication interface is configured to communicate the third movement command to the robot to cause the robot arm to move the verification symbol to at least the reference location during the idle period, h) receiving via the communication interface an additional image of the verification symbol from the camera, which is configured to capture the additional image of the verification symbol at least at the reference location during the idle period, the additional image being a verification image for the verification, i) determining a verification image coordinate used for the verification, the verification image coordinate being a coordinate at which the verification symbol appears in the verification image, j) determining a deviation parameter value based on an amount of deviation between the reference image coordinate and the verification image coordinate, the reference image coordinate and the verification image coordinate both associated with the reference location, wherein the deviation parameter value is indicative of a change since the first camera calibration in the camera that the communication interface is configured to communicate with, or a change since the first camera calibration in a relationship between the camera and the robot that the communication interface is configured to communicate with, k) determining whether the deviation parameter value exceeds a defined threshold, and l) performing, in response to a determination that the deviation parameter value exceeds the defined threshold, a second camera calibration to determine updated camera calibration information.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 4A and 4B provide a flow diagram that illustrates a method for performing verification of camera calibration, according to an embodiment herein.

DETAILED DESCRIPTION

Figure 1A:
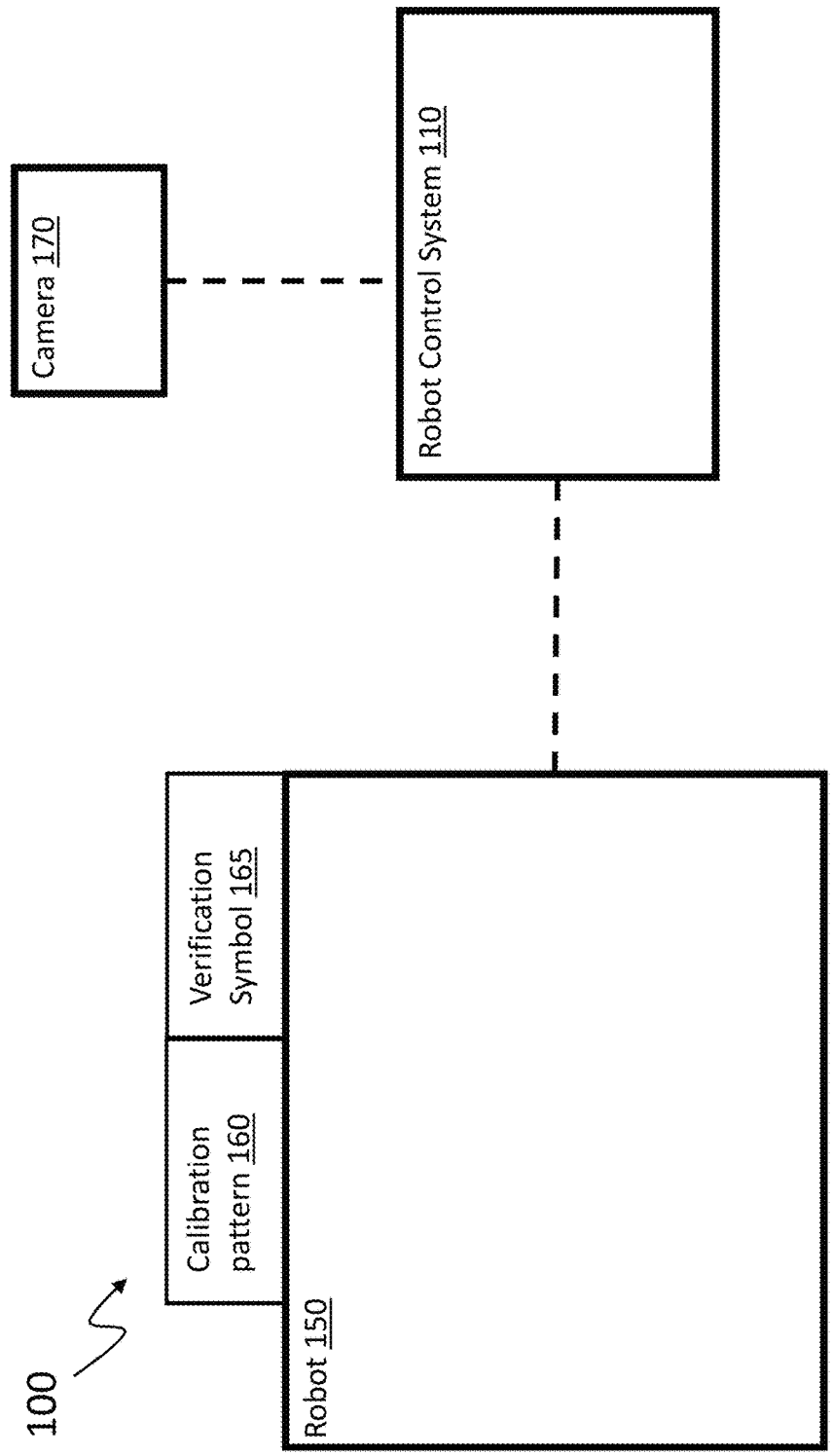
FIGS. 1A and 1B depict block diagrams of systems in which verification of camera calibration is performed, according to embodiments herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to verifying and/or updating calibration of a camera used to control a robot, such as a robot used in a warehouse, a manufacturing plant, or in some other environment. The calibration may be referred to as camera calibration, and may be performed by, e.g., a robot control system (also referred to as a robot controller) to generate camera calibration information that facilitates an ability of the robot control system to control of the robot based on images captured (e.g., photographed) by the camera. For instance, the robot may be used to pick up a package in a warehouse, wherein placement of a robot arm or other component of the robot may be based on images of the package captured by the camera. In that instance, the camera calibration information may be used along with the images of the package to determine, for example, a location and orientation of the package relative to the robot arm of the robot. The camera calibration may involve determining respective estimates of intrinsic parameters of the camera (which may also be referred to as internal parameters), and determining an estimate of a relationship between the camera and its external environment. An intrinsic parameter of the camera may have one or more parameter values such as a matrix, a vector, or a scalar value. Further, examples of an intrinsic parameter include a projection matrix and a distortion parameter. In an instance, the camera calibration may involve determining the camera's position with respect to a fixed position in an external environment, which may be expressed as a transformation function representing the relationship between the camera and the fixed position in the external environment. In some cases, the camera calibration may be performed with the aid of a calibration pattern, which may have pattern elements disposed at defined locations on the calibration pattern. The camera may capture an image of the pattern elements of the calibration pattern (also referred to as a calibration image), and the camera calibration may be performed based on comparing an image of the pattern elements with the defined locations of the pattern elements. Camera calibration is discussed in more detail in U.S. application Ser. No. 16/295,940, filed on Mar. 7, 2019 and titled "METHOD AND DEVICE FOR PERFORMING AUTOMATIC CAMERA CALIBRATION FOR ROBOT CONTROL", the entire content of which is incorporated herein by reference.

As stated above, one aspect of the present disclosure relates to verifying that a camera calibration performed at an earlier point in time is still accurate at a later point in time. The camera calibration performed at the earlier point in time may generate camera calibration information that reflects a property of the camera at that point in time, such as an intrinsic parameter of the camera or a relationship between the camera and its external environment at that point in time. In some cases, an earlier camera calibration may lose accuracy over time because the property of the camera may change over time. In a first example, an intrinsic parameter of the camera may change over time. Such a change may be caused by, e.g., a temperature change that alters a shape of a housing and/or a lens of the camera. In a second example, a relationship between the camera and its external environment may change over time. For instance, the camera may shift in position or orientation relative to, e.g., a base of the robot or a location in a warehouse. Such a change may be caused by, e.g., a temperature change that expands or contracts any component used to mount the camera, by a person or other object bumping into the camera, by a vibration in the camera's external environment (e.g., a warehouse), by a force from the camera's own weight (i.e., by gravity), or by some other factor. These changes may render the camera calibration information outdated, and using this camera calibration information to position a robot arm or other component of the robot at a later point in time may lead to errors. In other words, if a property associated with the camera has changed over time but the camera calibration information is not updated to reflect such a change, the robot may operate based on outdated or otherwise incorrect camera calibration information, thereby causing undesirable errors in the robot's operation. To address the possibility that changes in one or more properties of the camera may occur, a robot control system may automatically perform a verification that detects when camera calibration information from a camera calibration is no longer sufficiently accurate. Detecting such a condition may provide an indication of a change in a property of the camera. If the verification detects that the camera calibration information is no longer sufficiently accurate, then the robot control system may perform the camera calibration again to determine updated camera calibration information, which may reflect a more current property or properties of the camera. The updated camera calibration information may be used to control placement of the robot arm or some other aspect of the robot's operation. Accordingly, an automatic verification of the camera calibration and/or update of the camera calibration are performed to ensure that the robot operates based on correct information about one or more properties associated with the camera.

One aspect of the embodiments herein relates to verifying a camera calibration for a camera by comparing a reference image captured by the camera and a verification image captured by the camera. In some instances, the reference image may be an image of an object captured when the object is at a particular location at an earlier point in time, and the verification image may be an image of the object captured at a later point in time at the same location. The verification may determine whether there is too much deviation between the reference image and the verification image, such as whether the deviation exceeds a certain threshold. In some implementations, the object may be a verification symbol. More specifically, a robot arm or other component of the robot may have a verification symbol that is used to verify the camera calibration. Both the reference image and the verification image may capture or otherwise include the verification symbol, and the robot control system may compare the two images by comparing an appearance of the verification symbol in the reference image with an appearance of the verification symbol in the verification image. For instance, after the robot control system performs a camera calibration that produces camera calibration information at a particular point in time, the robot control system may control the robot arm (e.g., via a movement command) to move the verification symbol to a set of predefined locations within the camera's field of view (also referred to as a camera field of view of the camera), wherein these locations may be used as a set of reference locations for the verification. The camera may capture respective reference images of the verification symbol at the set of reference locations. In some cases, the reference images may be captured immediately after camera calibration is performed. The movement of the robot arm, or more specifically a movement command used to move the robot arm, may be based on the camera calibration information from the camera calibration that was just performed, or may be independent of the camera calibration information. In some cases, the reference images may be captured before the robot begins robot operation. After the reference images are captured, the robot may be considered ready to begin a robot operation to perform a task, and the robot control system may, e.g., control positioning of the robot arm based on images subsequently captured by the camera.

As stated above, the reference images may be compared against subsequently captured verification images. In an embodiment, the verification images may be captured during one or more idle periods detected by the robot control system. More specifically, when the robot operation begins, the robot may start performing robot tasks (e.g., by interacting with packages or other objects). While the robot is performing the robot operation, the robot control system may detect one or more idle periods for the robot. In some instances, the idle period may be a time period during which the robot is free from performing a robot task during the robot operation. In some cases, the robot control system may schedule the robot operation based on detecting or otherwise anticipating objects that the robot needs to interact with, and may detect an idle period based on detecting or otherwise anticipating an absence of objects with which the robot needs to interact.

During the idle period(s), the robot control system may control the robot arm or other component of the robot (e.g., via a movement command) to move to the reference locations and capture (e.g., via a camera command) a respective verification image at each of the reference locations. If the robot has a verification symbol disposed thereon, the robot control system may more specifically control the robot arm to move the verification symbol to the reference locations to capture the verification images. Subsequently, the robot control system may determine how much the respective verification images deviate from corresponding reference images at respective reference locations. In some cases, the deviation between the verification images and respective reference images may be expressed as a deviation parameter. If a value of the deviation parameter (also referred to as a deviation parameter value) exceeds a defined threshold for the deviation parameter (which may also be referred to as defined deviation threshold), the robot control system may perform an additional camera calibration to determine updated camera calibration information for the camera. When a value of the deviation parameter exceeds the defined deviation threshold, this condition may indicate that use of old camera calibration information may lead to an undesirable amount of error in the robot operation. Thus, in some cases, the robot operation may be paused or stopped while the additional calibration is performed (the pause may be considered another idle period). After the additional calibration is complete, a new set of reference images may be captured, and the robot operation may continue with the updated camera calibration information. During a subsequent idle period(s), a new set of verification images may be captured, and the robot control system may perform verification of the additional camera calibration by comparing the new set of reference images with the new set of verification images.

As stated above, if a value of the deviation parameter exceeds the defined deviation threshold, the robot control system may perform an additional camera calibration. If the value of the deviation parameter does not exceed the deviation threshold, then the robot operation may continue after an idle period without the robot control system performing an additional calibration. In this scenario, the camera may capture a new set of verification images at the respective reference locations during a subsequent idle period(s). When the new set of verification images are captured, the robot control system may again perform verification of the camera calibration by determining how much the new set of verification images deviate from respective reference images at respective reference locations.

As stated above, the robot arm may have a verification symbol, such as a ring pattern, disposed thereon, and the verification symbol may be captured by or otherwise included in the reference images and the verification images. In an embodiment, the robot control system may determine a deviation between the reference images and the respective verification images based on respective locations where the verification symbol appears in the reference images, and based on respective locations where the verification symbol appears in the verification images. For instance, the robot control system may determine a reference image coordinate for each reference location. The reference image coordinate for a particular location may be a coordinate at which the verification symbol appears in a reference image that was captured when the verification symbol was placed at that reference location. More specifically, the reference image coordinate may be associated with a particular reference location, and may refer to an image coordinate at which a verification symbol appears in a reference image, wherein the reference image was captured by a camera when the verification symbol was placed at that reference location. In the above example, the image coordinate may refer to a coordinate in an image, such as a pixel coordinate. When the robot control system subsequently places the verification symbol at a particular reference location again and obtains a corresponding verification image, the robot control system may determine a verification image coordinate. The verification image coordinate may also be associated with the reference location, and may refer to an image coordinate (e.g., a pixel coordinate) at which the verification symbol appears in the verification image, wherein the verification image was captured by the camera when the verification symbol was placed at the reference location. The robot control system may compare the reference image coordinate associated with a particular reference location with a verification image coordinate associated with the same reference location. This comparison may be done for each reference location at which a verification image and a reference image were captured.

In an instance, a reference image coordinate at which a verification symbol appears in a reference image may be a coordinate of a center of the verification symbol in the reference image (also referred to as a center coordinate of the verification symbol in the reference image). Similarly, a verification image coordinate at which the verification symbol appears in a verification image may be a coordinate of a center of the verification symbol in the verification image (also referred to as a center coordinate of the verification symbol in the verification image). For each reference location at which the robot arm and/or verification symbol was located when a corresponding verification image was captured, the robot control system may determine a deviation between the reference image coordinate associated with the reference location and the verification image coordinate associated with the same reference location. If the robot arm and/or verification symbol had been placed at a plurality of reference locations, the robot control system may determine respective amounts of deviation between respective reference image coordinates and respective verification image coordinates for the plurality of reference locations. The robot control system may further determine a value of a deviation parameter based on the respective amounts of deviation between the reference image coordinates and the respective verification image coordinates for respective reference locations.

In an instance, the verification symbol may include multiple shapes that are concentric with one another, such that the respective centers of the multiple shapes in the verification symbol are at the same or substantially the same location. For instance, the verification symbol may be a ring pattern that includes two or more concentric circles. In some cases, if the reference image coordinate of a verification symbol is a center coordinate of the verification symbol in a reference image, the robot control system may determine a center coordinate of the verification symbol based on respective center coordinates of the multiple shapes in the reference image, wherein the center coordinate of a particular shape is a coordinate of a center of that shape. If the verification symbol is a ring pattern, the center coordinate of the ring pattern in a reference image may be determined as an average of a center coordinate of a first circle forming the ring pattern and a center coordinate of a second circle forming the ring pattern in the reference image. Similarly, a center coordinate of a verification symbol in a verification image may be determined based on respective center coordinates of the multiple shapes forming the verification symbol in the verification image. In some cases, using multiple shapes to form the verification symbol may improve an accuracy of the verification. For instance, using the respective center coordinates of the multiple shapes in an image to determine a center coordinate of the verification symbol may improve a robustness of the verification against image noise. More specifically, if an image of the verification symbol includes image noise, the image noise may reduce an accuracy by which the robot control system detects a center coordinate of a particular shape of the verification symbol. However, if the center coordinate of that shape is averaged with a center coordinate of another shape to determine a center coordinate of the verification symbol, the averaged center coordinate may reduce an impact of the image noise. As a result, an accuracy in determining the center coordinate of the verification symbol may be improved.

In an instance, the verification symbol may have multiple regions with different respective colors, wherein respective areas of the multiple regions may have a distinct and defined ratio. For example, the verification symbol may have a first region having a first color (e.g., black) and a second region having a second color (e.g., white), where a ratio of an area of the first region to an area of the second region is defined or otherwise known. The distinct ratio may facilitate identifying the verification symbol in an image, especially if the image captures or otherwise includes other features, such as dots of a calibration pattern. For example, the robot arm that is moving the verification symbol may also have the calibration pattern disposed on the robot arm. The robot control system may use the ratio to distinguish the verification symbol from the dots of the calibration pattern. More specifically, because the ratio of the areas of the multiple regions of the verification symbol is defined as a distinct ratio, the robot control system may identify the verification symbol in an image based on the defined ratio. During identification of the verification symbol appearing in an image, the robot control system may distinguish the verification symbol from the calibration pattern or other feature based on the defined ratio. In some cases, the verification symbol may be identified in the image as a portion of the image having the multiple regions of different respective colors and having the defined ratio between respective areas of the multiple regions. If the robot control system or other system or device determines that a particular portion of the image does not have multiple regions with different respective colors, or that respective areas of the multiple regions have a ratio different than the defined ratio, the robot control system may determine that the portion of the image is not the verification symbol.

In an instance, the robot control system may perform the verification based on a temperature surrounding the robot. For instance, the robot control system may adjust the defined deviation threshold (i.e., define a new value for the deviation threshold) based on the temperature. For example, a temperature may affect various parts in the camera and/or in the robot, as some materials may be sensitive and/or may expand/contract based on a temperature. A change in temperature may cause an intrinsic parameter(s) of the camera to change, and/or cause a relationship between the camera and its external environment to change. In an embodiment, the deviation threshold may be set to have a first value when the temperature is outside of a defined range, while the deviation threshold may be set to have a second value lower than the first value when the temperature is within the defined range. For example, when the temperature is within a defined normal operating temperature range (e.g., within 10 degrees of the room temperature), then the deviation threshold may be the first value. When the temperature is outside the normal operating temperature range, then the deviation threshold may have the second value lower than the first value. The second value may be lower than the first value so as to more easily trigger an additional camera calibration when the temperature is outside of the normal operating range, as the temperature outside the normal operating temperature range may be more likely to cause changes to the camera or to its relationship with the external environment, and thus more likely to cause errors in operating the robot with old camera calibration information.

In an embodiment, the verification of the camera calibration may rely on only a single reference location. Alternatively, the verification of the camera calibration may rely on a plurality of reference locations. The reference locations may be any locations in a camera's field of view, or may be specific, defined locations. For instance, the reference locations may be defined as locations on a surface of at least one imaginary sphere that is concave with respect to the camera. At each reference location in this scenario, the robot arm may be controlled to position the verification symbol such that the verification symbol is positioned tangentially to the surface of the at least one imaginary sphere while facing the camera. This positioning may better allow the verification symbol to be photographed or otherwise captured head-on by the camera (with the verification symbol directly facing the camera), so that an image of the verification symbol resembles a top view rather than a perspective view of the verification symbol. For instance, if the verification symbol is a ring pattern, positioning the ring pattern to be tangent to the surface of the imaginary sphere may allow a resulting image of the ring pattern to still appear circular, rather than appear elliptical. The resulting image may exhibit less perspective distortion or no perspective distortion (relative to a scenario in which the ring pattern appears elliptical in the image). The lack of perspective distortion may facilitate an accurate determination of a center coordinate of the ring pattern. In some cases, the reference locations may be divided among multiple imaginary spheres that are all concave with respect to the camera. The multiple imaginary spheres may share a common center and may be different in size, such that each imaginary sphere has a spherical surface having a different respective distance from the camera. In some cases, the camera may be a common center for all of the imaginary spheres.

FIG. 1A illustrates a block diagram of a robot operation system 100 (also referred to as the system 100) for performing automatic camera calibration and automatic verification of the camera calibration. The robot operation system 100 includes a robot 150, a robot control system 110 (also referred to as a robot controller), and a camera 170. In an embodiment, the system 100 may be located within a warehouse, a manufacturing plant, or other premises. The robot control system 110 may be configured to perform camera calibration, which is discussed in more detail below, to determine camera calibration information that is later used to control the robot 150 to perform a robot operation, such as picking up packages in the warehouse. The robot control system 110 may further be configured to perform camera calibration verification, which is also discussed in more detail below, to verify whether the camera calibration information is still sufficiently accurate. In some cases, the robot control system 110 is configured to perform the camera calibration and to control the robot 150 to perform robot operation based on the camera calibration information. In some cases, the robot control system 110 may form a single device (e.g., a single console or a single computer) that communicates with the robot 150 and the camera 170. In some cases, the robot control system 110 may include multiple devices.

In some cases, the robot control system 110 may be dedicated to performing the camera calibration and/or verification of the camera calibration, and may communicate the most current camera calibration information to another control system (also referred to as another controller, not shown) that then controls the robot 150 to perform a robot operation based on the most current camera calibration information. The robot 150 may be positioned based on images captured by the camera 170 and on the camera calibration information. More specifically, the robot control system 110 may, in an embodiment, be configured to generate movement commands based on the images and based on the camera calibration information, and to communicate the movement commands to the robot 150 to control movement of its robot arm. In some cases, the robot control system 110 is configured to perform verification of the camera calibration during an idle period in the robot operation. In some cases, the robot control system 110 is configured to perform the verification while performing a robot operation with the robot 150.

In an embodiment, the robot control system 110 may be configured to communicate via a wired or wireless communication with the robot 150 and the camera 170. For instance, the robot control system 110 may be configured to communicate with the robot 150 and/or the camera 170 via a RS-232 interface, a universal serial bus (USB) interface, an Ethernet interface, a Bluetooth® interface, an IEEE 802.11 interface, or any combination thereof. In an embodiment, the robot control system 110 may be configured to communicate with the robot 150 and/or the camera 170 via a local computer bus, such as a peripheral component interconnect (PCI) bus.

In an embodiment, the robot control system 110 may be separate from the robot 150, and may communicate with the robot via the wireless or wired connection discussed above. For instance, the robot control system 110 may be a standalone computer that is configured to communicate with the robot 150 and the camera 170 via a wired connection or wireless connection. In an embodiment, the robot control system 110 may be an integral component of the robot 150, and may communicate with other components of the robot 150 via the local computer bus discussed above. In some cases, the robot control system 110 may be a dedicated control system (also referred to as a dedicated controller) that controls only the robot 150. In other cases, the robot control system 110 may be configured to control multiple robots, including the robot 150. In an embodiment, the robot control system 110, the robot 150, and the camera 170 are located at the same premises (e.g., warehouse). In an embodiment, the robot control system 110 may be remote from the robot 150 and the camera 170, and may be configured to communicate with the robot 150 and the camera 170 via a network connection (e.g., local area network (LAN) connection).

In an embodiment, the robot control system 110 may be configured to retrieve or otherwise receive images of a calibration pattern 160 and/or of a verification symbol 165 disposed on the robot 150 (e.g., on a robot arm of the robot) from the camera 170. In some instances, the robot control system 110 may be configured to control the camera 170 to capture such images. For example, the robot control system 110 may be configured to generate a camera command that causes the camera 170 to capture an image of a field of view of the camera 170 (also referred to as a camera field of view), and to communicate the camera command to the camera 170 via the wired or wireless connection. The same command may cause the camera 170 to also communicate the image to the robot control system 110, or more generally to a storage device accessible by the robot control system 110. Alternatively, the robot control system 110 may generate another camera command that causes the camera 170, upon receiving the camera command, to communicate an image(s) it has captured to the robot control system 110. In an embodiment, the camera 170 may automatically capture an image in its camera field of view, either periodically or in response to a defined triggering condition, without needing a camera command from the robot control system 110. In such an embodiment, the camera 170 may also be configured to automatically, without a camera command from the robot control system 110, communicate the image to the robot control system 110 or, more generally, to a storage device accessible by the robot control system 110.

Figure 1B:
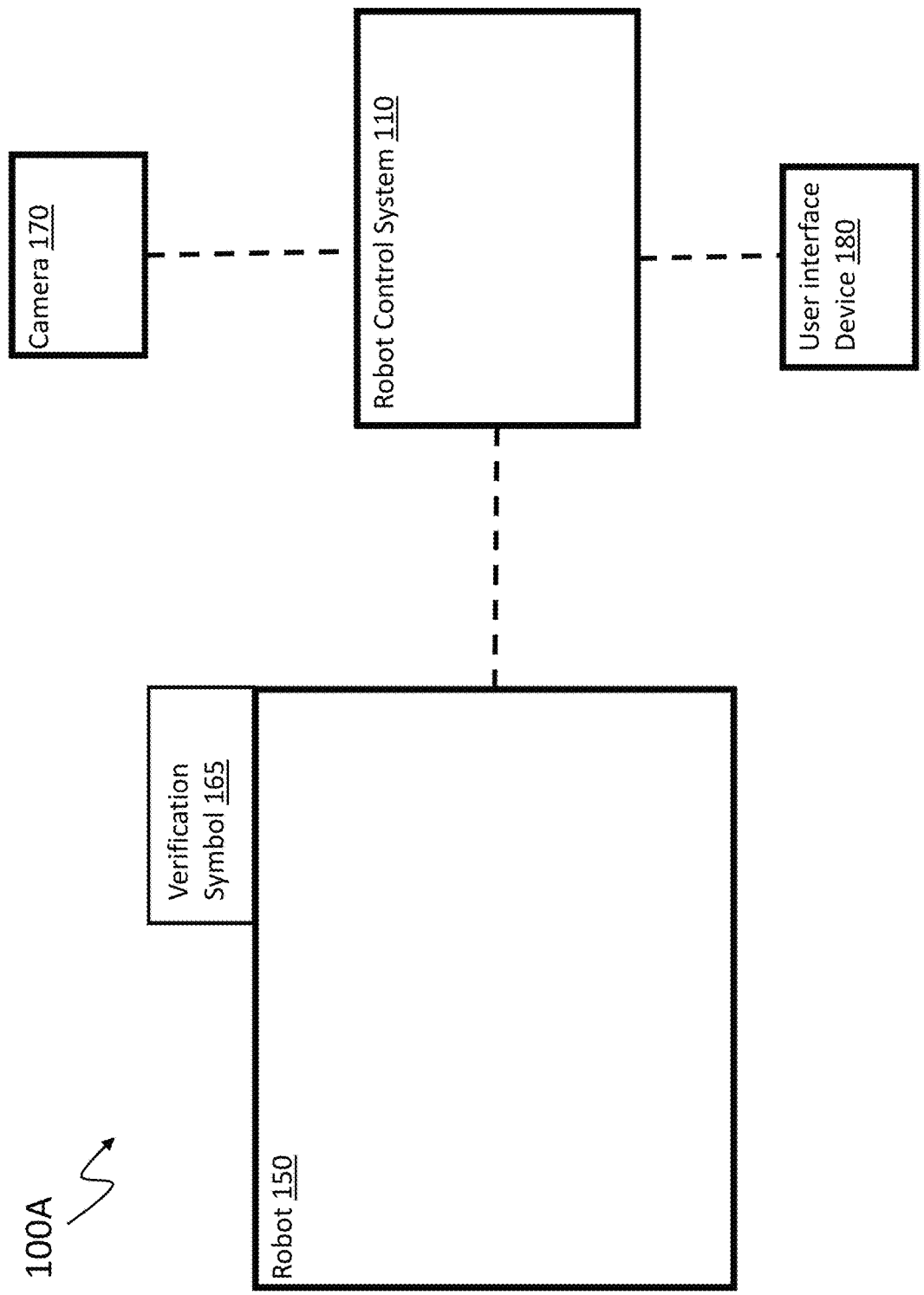

In an embodiment, the robot control system 110 may be configured to control movement of the robot 150 via movement commands that are generated by the robot control system 110 and communicated over the wired or wireless connection to the robot 150. The robot 150 may be configured to have one or both of the calibration pattern 160 and the verification symbol 165 on the robot 150. For instance, FIG. 1B depicts a robot operation system 100A in which the verification symbol 165 is disposed on the robot 150 without the presence of the calibration pattern 160 of FIG. 1A. In one instance, the verification symbol 165 may be a part of the robot 150 and may be permanently disposed on the robot 150. For example, the verification symbol 165 may be permanently painted on the robot 150, or may be part of a sticker or board that is permanently attached to the robot 150. In another instance, the verification symbol 165 may be a separate component that is attachable to and detachable from the robot 150. The verification symbol 165 may be permanently disposed on the robot 150, or may be a separate component that can be attached to and detached from the robot 150.

In an embodiment, the only images used in system 100 to control the robot 150 may be those captured by the camera 170. In another embodiment, the system 100 may include multiple cameras, and the robot 150 may be controlled by images from the multiple cameras.

FIG. 1B further illustrates an embodiment in which the robot control system 110 is in communication with a user interface device 180. The user interface device 180 may be configured to interface with an operator of the robot 150, such as an employee at a warehouse in which the robot 150 is located. The user interface device 180 may include, e.g., a tablet computer or desktop computer that provides a user interface displaying information relating to operation of the robot 150. As stated above, the robot control system 110 may be configured to detect when a deviation parameter value exceeds a defined deviation threshold. In an embodiment, the user interface device 180 may provide an alarm or other alert to notify the operator of the deviation parameter value exceeding the defined deviation threshold.

Figure 1C:
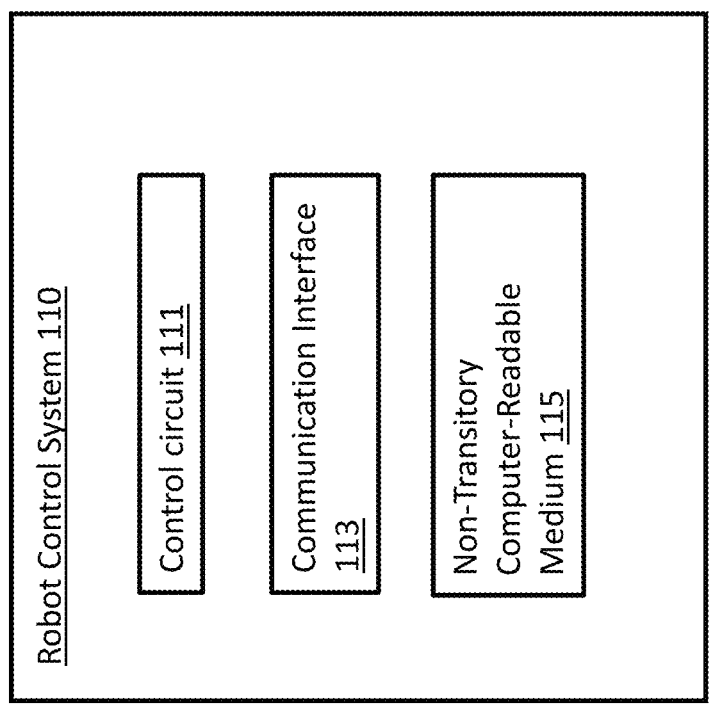
FIG. 1C depicts a block diagram of a robot control system configured to perform verification of camera calibration, according to an embodiment herein.

FIG. 1C depicts a block diagram of the robot control system 110. As illustrated in the block diagram, the robot control system 110 includes a control circuit 111, a communication interface 113, and a non-transitory computer-readable medium 115 (e.g., memory). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more components that are configured to communicate with the camera 170 of FIG. 1A or 1B and the robot 150 of FIG. 1A or 1B. For instance, the communication interface 113 may include a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof. In an embodiment, the control circuit 111 may be configured to generate a movement command (e.g., a motor movement command) and to output the movement command to the communication interface 113. In this embodiment, the communication interface 113 may be configured to communicate the movement command to the robot 150 to control movement of a robot arm or other component of the robot 150. In an embodiment, the control circuit 111 may be configured to generate a camera command and to output the camera command (e.g., capture image command) to the communication interface 113. In this embodiment, the communication interface 113 may be configured to communicate the camera command to the camera 170 to control the camera 170 to photograph or otherwise capture an image of an object in the camera's field of view. In an embodiment, the communication interface 113 may be configured to receive an image or other data from the camera 170, and the control circuit 111 may be configured to receive the image from the communication interface 113.

In an embodiment, the non-transitory computer-readable medium 115 may include computer memory. The computer memory may comprise, e.g., dynamic random access memory (DRAM), solid state integrated memory, and/or a hard disk drive (HDD). In some cases, the camera calibration may be implemented through computer-executable instructions (e.g., computer code) stored on the non-transitory computer-readable medium 115. In such cases, the control circuit 111 may include one or more processors configured to perform the computer-executable instructions to perform verification of camera calibration (e.g., the steps illustrated in FIGS. 4A, 4B, and 9).

Figure 1D:
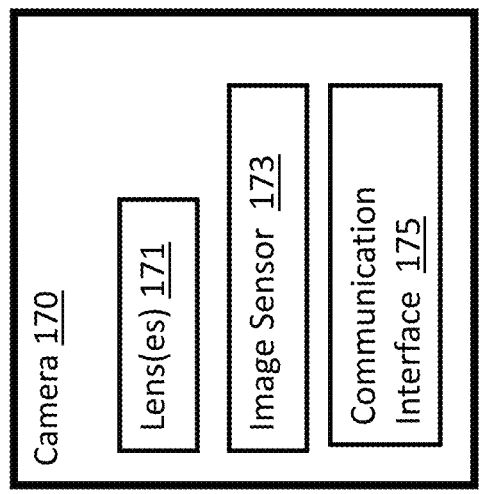
FIG. 1D depicts a block diagram of a camera for which camera calibration is performed, according to an embodiment herein.

FIG. 1D depicts a block diagram of the camera 170 that includes one or more lenses 171, an image sensor 173, and a communication interface 175. The communication interface 175 may be configured to communicate with the robot control system 110 of FIG. 1A, 1B or 1C, and may be similar to the communication interface 113 of FIG. 1C of the robot control system 110. In an embodiment, the one or more lenses 171 may focus light that is coming from outside the camera 170 onto the image sensor 173. In an embodiment, the image sensor 173 may include an array of pixels configured to represent an image via respective pixel intensity values. The image sensor 173 may include a charge-coupled device (CCD) sensor, a complementary metal oxide semiconductor (CMOS) sensor, a quanta image sensor (QIS), or any other image sensor.

Figure 2:
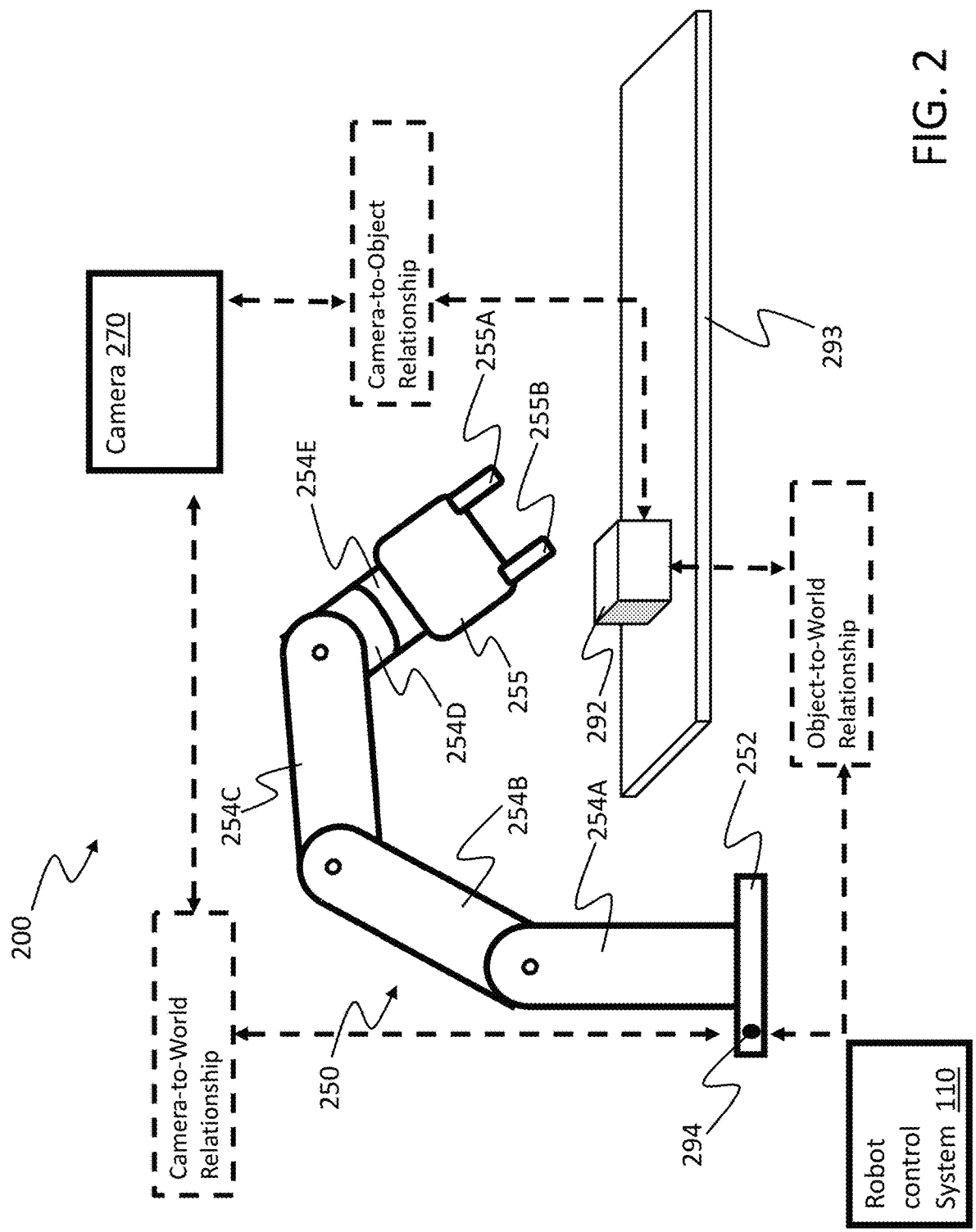
FIG. 2 depicts a system that illustrates a robot being controlled based on camera calibration information obtained from camera calibration, according to an embodiment herein.

As stated above, the camera calibration may be performed in order to facilitate the control of a robot based on images captured by a camera. For instance, FIG. 2 depicts a robot operation system 200 (also referred to as the system 200) in which the images are used to control a robot 250 to perform a robot operation, such as an operation to pick up an object 292 in a warehouse. More specifically, the system 200 may be an embodiment of system 100 of FIG. 1A, and includes a camera 270, the robot 250, and the robot control system 110. The camera 270 may be an embodiment of the camera 170 of FIG. 1A, 1B, or 1D, and the robot 250 may be an embodiment of the robot 150 of FIG. 1A or 1B. The camera 270 may be configured to capture an image of the object 292 (e.g., a package for shipping) disposed on a conveyor belt 293 in the warehouse, and the robot control system 110 may be configured to control the robot 250 to pick up the object 292. When there are one or more objects on the conveyor belt 293, the robot control system 110 may be configured to schedule movement of the robot 250 to pick up the objects.

The robot control system 110 may in some cases be configured to detect an idle period for the robot operation by detecting when there are no objects on the conveyor belt 293, or when there are no objects on the conveyor belt 293 that are within reach of the robot 250.

In the embodiment of FIG. 2, the robot 250 may have a base 252 and a robot arm that is movable relative to the base 252. More specifically, the robot arm may comprise a plurality of links 254A through 254E, and a robot hand 255 attached to the link 254E. The plurality of links 254A through 254E may be rotatable relative to each other, and/or may be prismatic links that are movable linearly with respect to each other. Because FIG. 2 involves the robot 250 that is used to pick up objects, the robot hand 255 may include grippers 255A and 255B used to grab the object 292. In an embodiment, the robot control system 110 may be configured to communicate a movement command to rotate one or more of the links 254A through 254E. The movement command may be a low-level command, such as motor movement commands, or a high-level command. If the movement command from the robot control system 110 is a high-level command, the robot 150 may be configured to convert the high-level command to a low-level command.

In an embodiment, the camera calibration information determined from the camera calibration describes a relationship between the camera 270 and the robot 250, or more specifically a relationship between the camera 270 and a world point 294 that is stationary relative to the base 252 of the robot 250. The world point 294 may represent a world or other environment in which the robot 250 is located, and may be any imaginary point that is stationary relative to the base 252. In other words, the camera calibration information may include information describing a relationship between the camera 270 and the world point 294. In an embodiment, this relationship may refer to a location of the camera 270 relative to the world point 294, as well as an orientation of the camera 270 relative to a reference orientation for the robot 250. The above relationship between the camera 270 and the world point 294 may be referred to as a camera-to-world relationship, and may be used to represent a relationship between the camera 270 and the robot 250. In some cases, the camera-to-world relationship may be used to determine a relationship between the camera 270 and the object 292 (also referred to as a camera-to-object relationship), and a relationship between the object 292 and the world point 294 (also referred to as an object-to-world relationship). The camera-to-object relationship and the object-to-world relationship may be used to control the robot 250 to pick up the object 292.

In an embodiment, the camera calibration information may describe an intrinsic parameter of the camera 270, where the intrinsic parameter may be any parameter whose value is independent of a location and an orientation of the camera 270. The intrinsic parameters may characterize a property of the camera 270, such as its focal length, a size of its image sensor, or an effect of lens distortion introduced by the camera 270.

Figure 3:
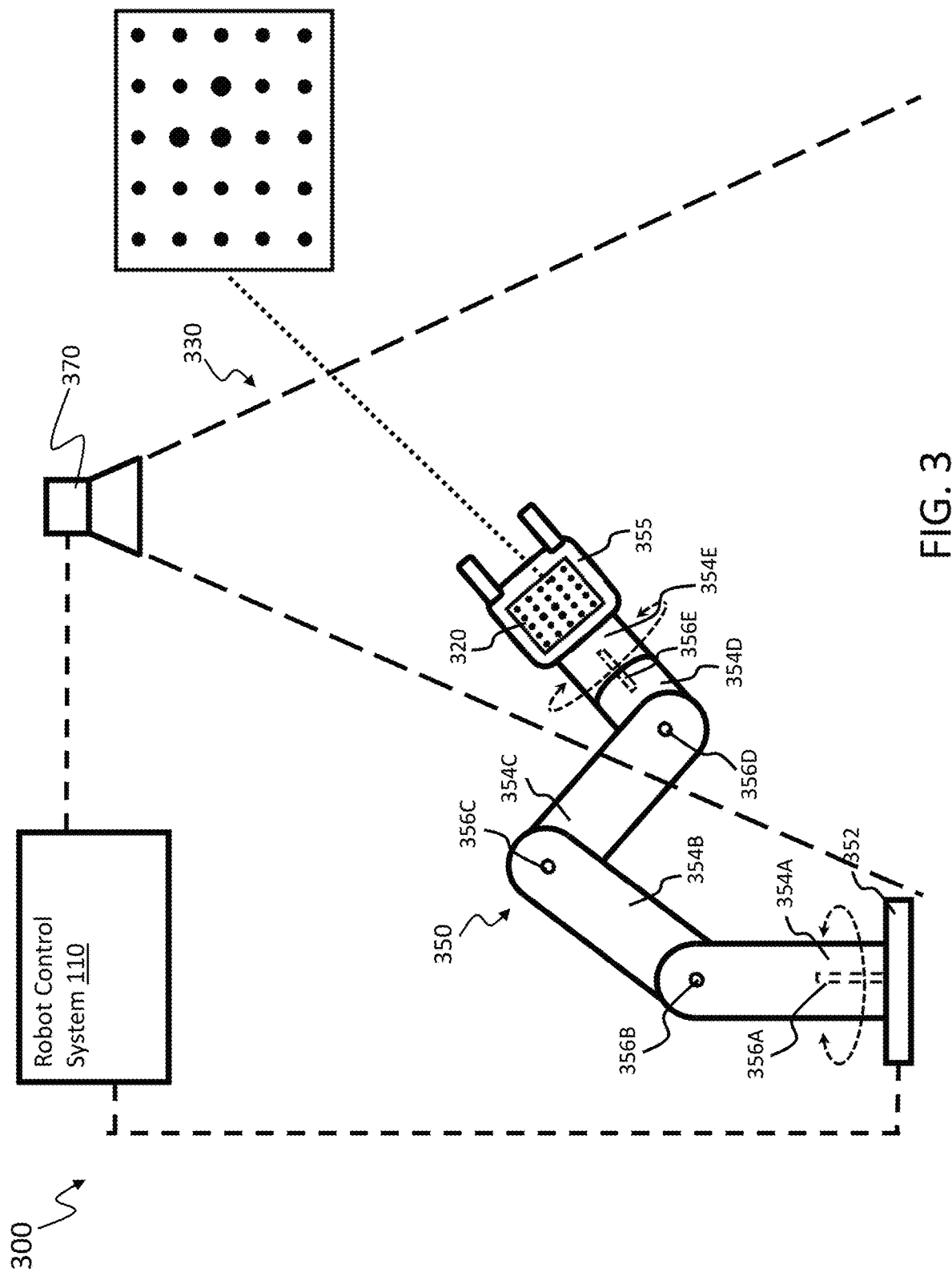
FIG. 3 depicts a system for performing camera calibration, according to an embodiment herein.

An example showing a detailed structure of an example of a robot 350 is depicted in FIG. 3, which depicts a robot operation system 300 that includes the robot control system 110 in communication with a camera 370 and the robot 350. The camera 370 may be an embodiment of the camera 170/270 of FIG. 1A, 1B, 1D, or 2 respectively, and the robot 350 may be an embodiment of the robot 150/250 of FIG. 1A, 1B, or 2 respectively. The camera 370 may be capable of capturing images within a camera field of view 330. The robot 350 may include a base 352 and a robot arm movable relative to the base 352. The robot arm includes one or more links, such as links 354A through link 354E, and a robot hand 355. In an embodiment, the links 354A-354E may be rotatably attached to each other. For instance, the link 354A may be rotatably attached to the robot base 352 via a joint 356A. The remaining links 354B through 354E may be rotatably attached to each other via joints 356B through 356E. In an embodiment, the base 352 may be used to mount the robot 350 to, e.g., a mounting frame or mounting surface (e.g., floor of a warehouse). In an embodiment, the robot 350 may include a plurality of motors that are configured to move the robot arm by rotating the links 354A-354E. For instance, one of the motors may be configured to rotate the first link 354A with respect to the joint 356A and the base 302, as shown with the dotted arrow in FIG. 3. Similarly, other motors of the plurality of motors may be configured to rotate the links 354B through 354E. The plurality of motors may be controlled by the robot control system 110. FIG. 3 further depicts the robot hand 355 disposed in a fixed manner on the fifth link 354E. The robot hand 355 may have a calibration pattern 320 thereon, such that the robot control system 110 may capture images of the calibration pattern 320 via the camera 370 and perform camera calibration based on the captured images of the calibration pattern 320. For example, the robot control system 110 may move the robot arm such that the calibration pattern 320 may be within the camera field of view 330 and visible to the camera 370 when the camera 370 is being used to capture the images of the calibration pattern 320 (also referred to as calibration images). After the camera calibration is performed, the robot hand 355 may be removed and replaced with another robot hand, such as a robot hand having a verification symbol disposed thereon, as discussed below in more detail.

Figure 4B:
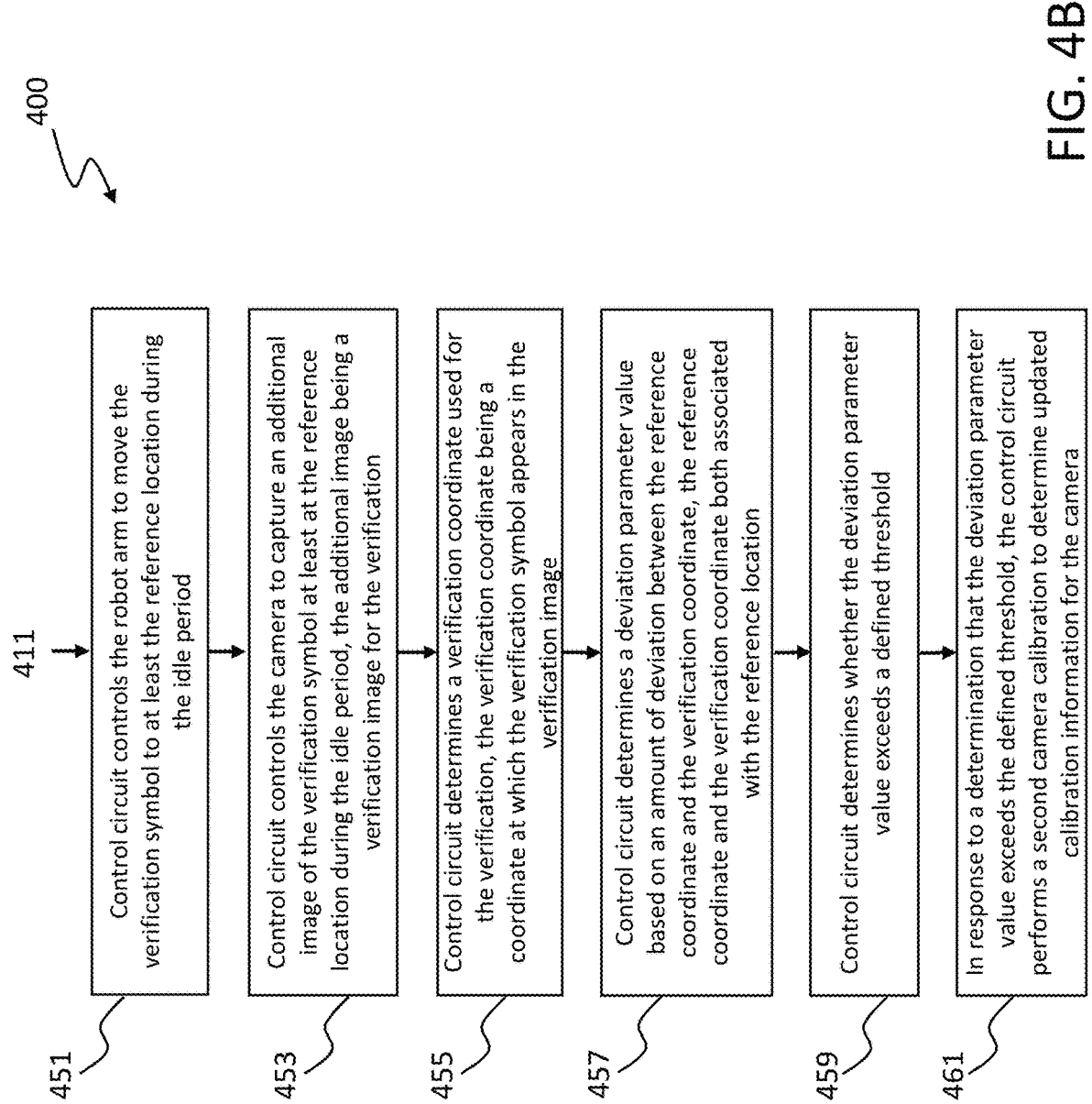

As stated above, according to an embodiment, the camera calibration verification may involve comparing a reference image coordinate at which a verification symbol appears in a reference image to a verification image coordinate at which the verification symbol appears in a verification image. The comparison may determine a deviation between the verification image coordinate and the reference image coordinate, and the deviation may be used to determine whether to perform additional camera calibration. The verification image may be captured during an idle period of a robot operation. FIGS. 4A and 4B depict flow diagrams that illustrate a method 400 for verification of camera calibration, according to an embodiment. In an embodiment, the method 400 may be performed by the control circuit 111 of the robot control system 110. As stated above, the robot control system 110 may include the communication interface 113 of FIG. 1C, which is configured to communicate with the robot 150 of FIG. 1A or 1B, and with the camera 170 of FIG. 1A, 1B, or 1D. In an embodiment, the robot may have a base (e.g. the base 252 of FIG. 2 or the base 352 of FIG. 3) and a robot arm (e.g. the robot arm of FIG. 2 or FIG. 3) with a verification symbol disposed on thereon, and wherein the robot arm is movable relative to the base.

Figure 5A:
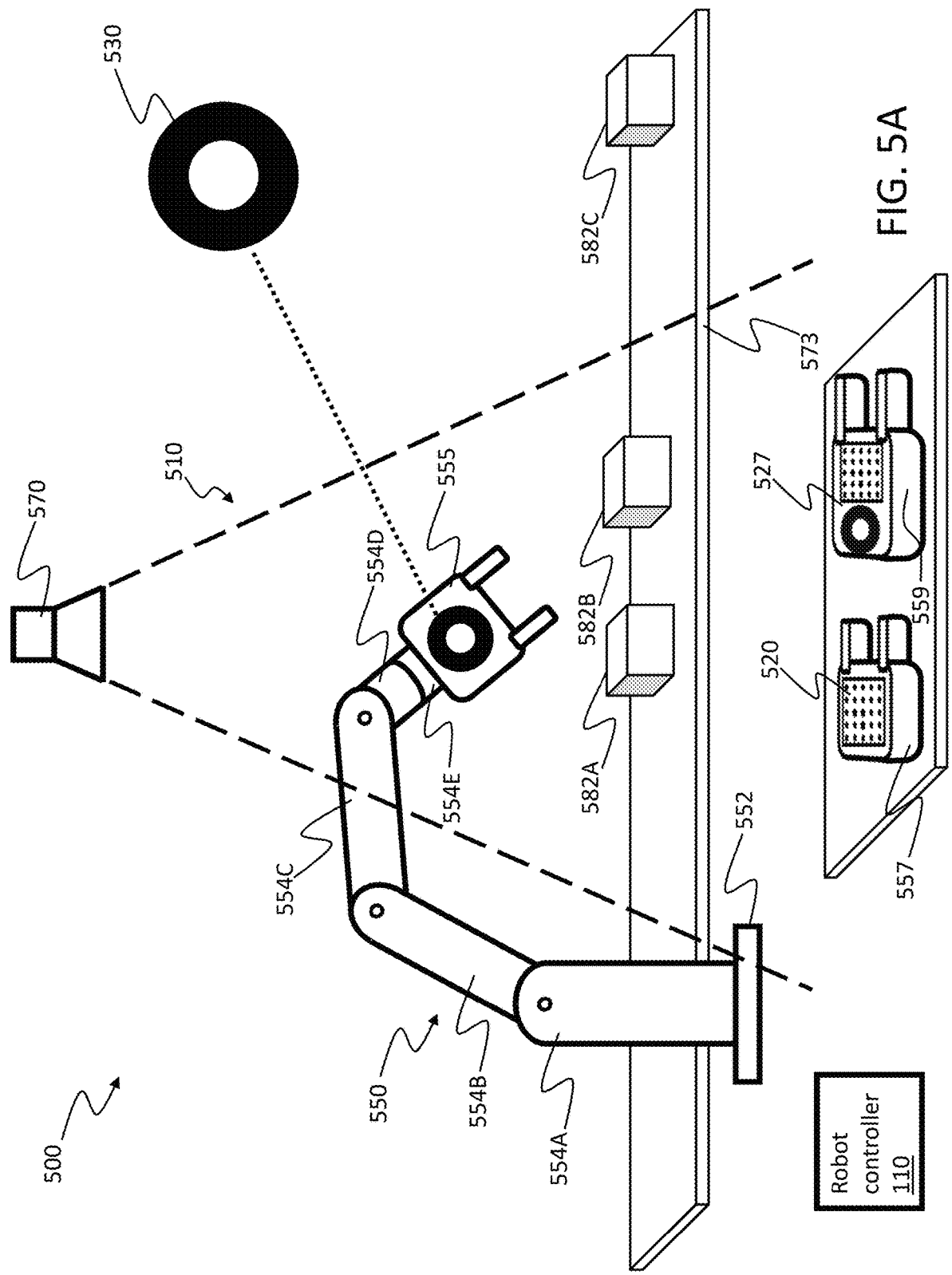
FIGS. 5A and 5B illustrate a system in which a verification symbol is disposed on a robot, wherein the verification symbol is used to perform verification of camera calibration, according to an embodiment herein.
Figure 5B:
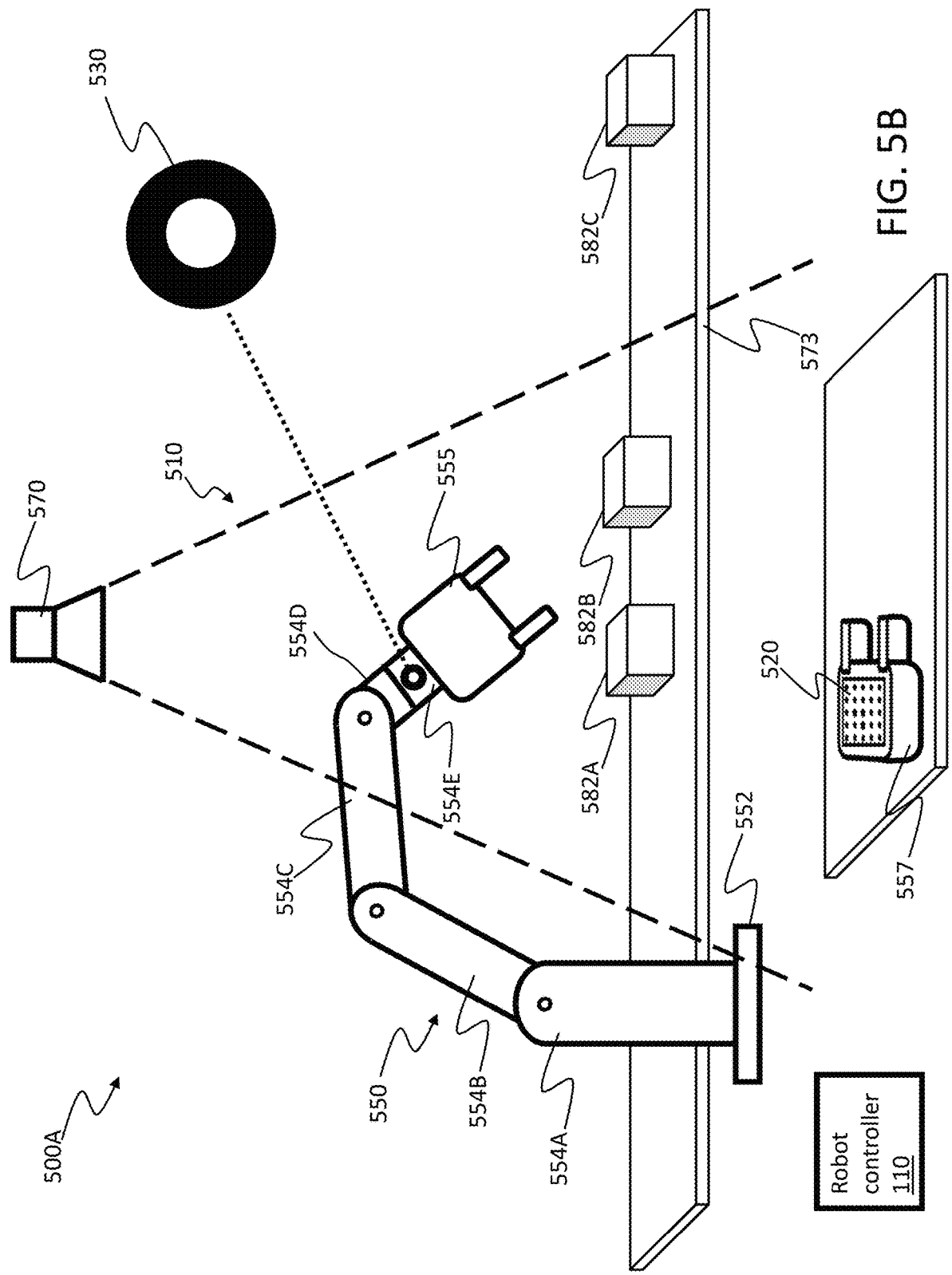

An example environment in which the method 400 is performed is depicted in FIGS. 5A and 5B, which depicts a robot operation system 500/500A that each includes the robot control system 110 in communication with a camera 570 and a robot 550. The camera 570 may be an embodiment of the camera 170/270/370 of FIG. 1, 2, or 3 respectively, and the robot 550 may be an embodiment of the robot 150/250/350 of FIG. 1A, 1B, 2, or 3, respectively. The robot 550 may include a base 552 and a robot arm movable relative to the base 552. The robot arm includes one or more links, such as links 554A through link 554E. In an embodiment, the links 554A-554E may be rotatably attached to each other. For instance, the link 554A may be rotatably attached to the robot base 552. The remaining links 554B through 554E may be rotatably attached to each other via a plurality of joints. In an embodiment, the base 552 may be used to mount the robot 552 to, e.g., a mounting frame or mounting surface (e.g., floor of a warehouse). The robot 550 may operate in a similar manner to the robot 350 of FIG. 3. For instance, the robot 550 may include multiple motors configured to move the robot arm by rotating the links 554A-554E relative to each other. The robot arm may further include a robot hand that is attached to the link 554E. For example, FIG. 5A depicts a first robot hand 555, a second robot hand 557, and a third robot hand 559, each of which may be attachable to and detachable from the fifth link 554E. The robot hand 555/557/559 may include, e.g., a gripper or suction device that is configured to pick up objects (e.g., 582A, 582B, 582C) from a conveyor belt 573. When the robot hand 555/557/559 is attached to the fifth link 554E, the attachment may be in a mixed manner. The attachment and detachment may be performed manually or automatically. In one example, the fifth link 554E may be attached to the first robot hand 555, as depicted in FIGS. 5A and 5B, and the robot control system 110 may control the robot 550 to cause the fifth link 554E to release the first robot hand 555 and attach the fifth link 554E to the second robot hand 557. In another embodiment, the fifth link 554E may be permanently attached to a robot hand (e.g., robot hand 559).

In an embodiment, the robot 550 may have a verification symbol 530 disposed thereon. In some cases, the verification symbol 530 may be permanently disposed on the robot 550. In some cases, the verification symbol 530 may be disposed on a robot arm of the robot 550, such as one of the links 554A-554E, or on a robot hand. For instance, FIG. 5A depicts the verification symbol 530 being disposed on the first robot hand 555 and the third robot hand 559, while FIG. 5B depicts the verification symbol 530 being disposed on the link 554E. The verification symbol 530 may be directly painted on the robot 550, or may be attached to the robot 550, such as via a sticker or a flat board. In the example depicted in FIG. 5A, the second robot hand 557 or the third robot hand 559 may be used to perform camera calibration, because they each have a respective calibration pattern 520/527 disposed thereon, while the first robot hand 555 or the third robot hand 559 may be used to perform verification of the camera calibration, because they each have a respective verification symbol 530 disposed thereon.

Returning to FIG. 4A, in an embodiment the method 400 may begin with step 401, in which the control circuit 111 performs a first camera calibration to determine camera calibration information associated with the camera (e.g., camera 170/270/370/570 of FIG. 1, 2, 3, or 5 respectively). More specifically, the camera calibration information may include camera calibration values for the camera. In this embodiment, the control circuit 111 may perform the first camera calibration based on images of a calibration pattern (also referred to as calibration images).

For instance, to perform the first camera calibration, the robot 550 of FIG. 5A may be attached to the second robot hand 557 having the calibration pattern 520 or the third robot hand 559 having the calibration pattern 527. FIG. 3 depicts a similar environment in which the first camera calibration can be performed. During this step, the first robot hand 555 may be detached from the fifth link 554E, in which the calibration pattern 320 is used to perform camera calibration. The first camera calibration may be performed before starting a robot operation. For instance, the robot operation may begin with a robot task such as the first robot hand 555 interacting with a first object 582A on a conveyor belt. During the first camera calibration, the robot 550 may be equipped with the second robot hand 557. The robot control system 110 may control the robot arm of the robot 550, via movement commands, to move the calibration pattern 520 to various locations within a camera field of view 510 of the camera 570 and to capture respective images of the calibration pattern 520 at such locations. The robot control system 110 may perform the first camera calibration to determine the camera calibration information for the camera 570 based on the captured images of the calibration pattern 520. In an example, the camera calibration information may include information describing a relationship between the camera 570 and the robot 550. In an example, the camera calibration information may describe the intrinsic parameters of the camera 570. Camera calibration is discussed in more detail in U.S. application Ser. No. 16/295,940, filed on Mar. 7, 2019 and titled "METHOD AND DEVICE FOR PERFORMING AUTOMATIC CAMERA CALIBRATION FOR ROBOT CONTROL," the entire content of which is incorporated herein by reference Returning to FIG. 4A, the method 400 may further include step 403, in which the control circuit 111 controls the robot arm to move the verification symbol (e.g., 530 of FIG. 5), during or after the first camera calibration, to a location within a camera field of view (e.g., 510) of the camera (e.g., 570) by outputting a first movement command to the communication interface 113 of the robot control system 110. The communication interface 113 may be configured to communicate the movement command to the robot to cause the robot arm to move the verification symbol (e.g., 530), during or after the first camera calibration, to the location within the camera field of view (e.g., 510). The movement command may also cause the robot arm to orient the verification symbol to face the camera (e.g., 570), or more generally to be visible to the camera. The location may be used as a reference location of one or more reference locations for verification of the first camera calibration. For instance, when the verification process acquires images of the verification symbol over time, the control circuit 111 may control the robot arm to consistently position the verification symbol (e.g., 530) at the same one or more locations, such that the one or more locations may be used as one or more reference locations. Further, as described below with respect to steps 405-459, the verification process may compare later images of the verification symbol against a set of earlier images of the verification symbol (e.g., 530), such as images obtained immediately after the first camera calibration is performed. The later images may be used as verification images, while the images against which the later images are compared may be used as reference images.

In step 405, the control circuit 111 may receive (e.g., retrieve) an image of the verification symbol (e.g., 530) from the camera (e.g., 170/270/370/570) via the communication interface 113, wherein the image is a reference image for the verification. The image may have been captured by the camera while the verification symbol is or was at the reference location. In an embodiment, the communication interface 113 may initially receive the reference image from the camera, and the control circuit 111 may then receive the reference image from the communication interface 113. In an embodiment, step 405 is performed without the control circuit 111 generating a camera command for the camera. In an embodiment, step 405 may involve the control circuit 111 generating a camera command and communicating the camera command to the camera via the communication interface 113. The camera command may control the camera to capture an image of the verification symbol at the reference location.

FIGS. 5A through 6B illustrate aspects of steps 403 and 405. In the embodiment of FIG. 5A, after the first camera calibration is performed with, e.g., the second robot hand 557, the second robot hand 557 may be replaced with the third robot hand 559, which has the verification symbol 530 disposed thereon. In this instance, the robot control system 110 controls the robot arm of the robot 550 (e.g., via one or more movement commands) to move the verification symbol 530 to one or more reference locations within the camera field of view 510 of the camera 570. The one or more reference locations may include any location within the camera field of view 510, or may be a set of one or more specific locations, such as locations disposed on a surface of an imaginary sphere, as discussed below in more detail. In another instance, in the embodiment of FIG. 5B, during or after the first camera calibration, the robot control system 110 may control the robot arm to move the verification symbol 530 to one or more reference locations within the camera field of view 510. In this instance, the one or more reference locations may include any location at which verification symbol 530 was photographed (along with the calibration pattern 520) during the first camera calibration, or may be a set of one or more specific locations to which the verification symbol 530 is moved after the first camera calibration is performed. The robot control system 110 may control the movement of the robot arm of the robot 550 in this step with guidance of the camera 570 based on the camera calibration information obtained from the first camera calibration, or may do so without such guidance. In an embodiment, the reference locations may be defined locations that are stored in a local or remote storage device and may be retrieved. They may be stored in the form of coordinates (e.g., Cartesian coordinates) or as motor commands for rotating the links 554A-554E, or in some other manner.

Figure 6A:
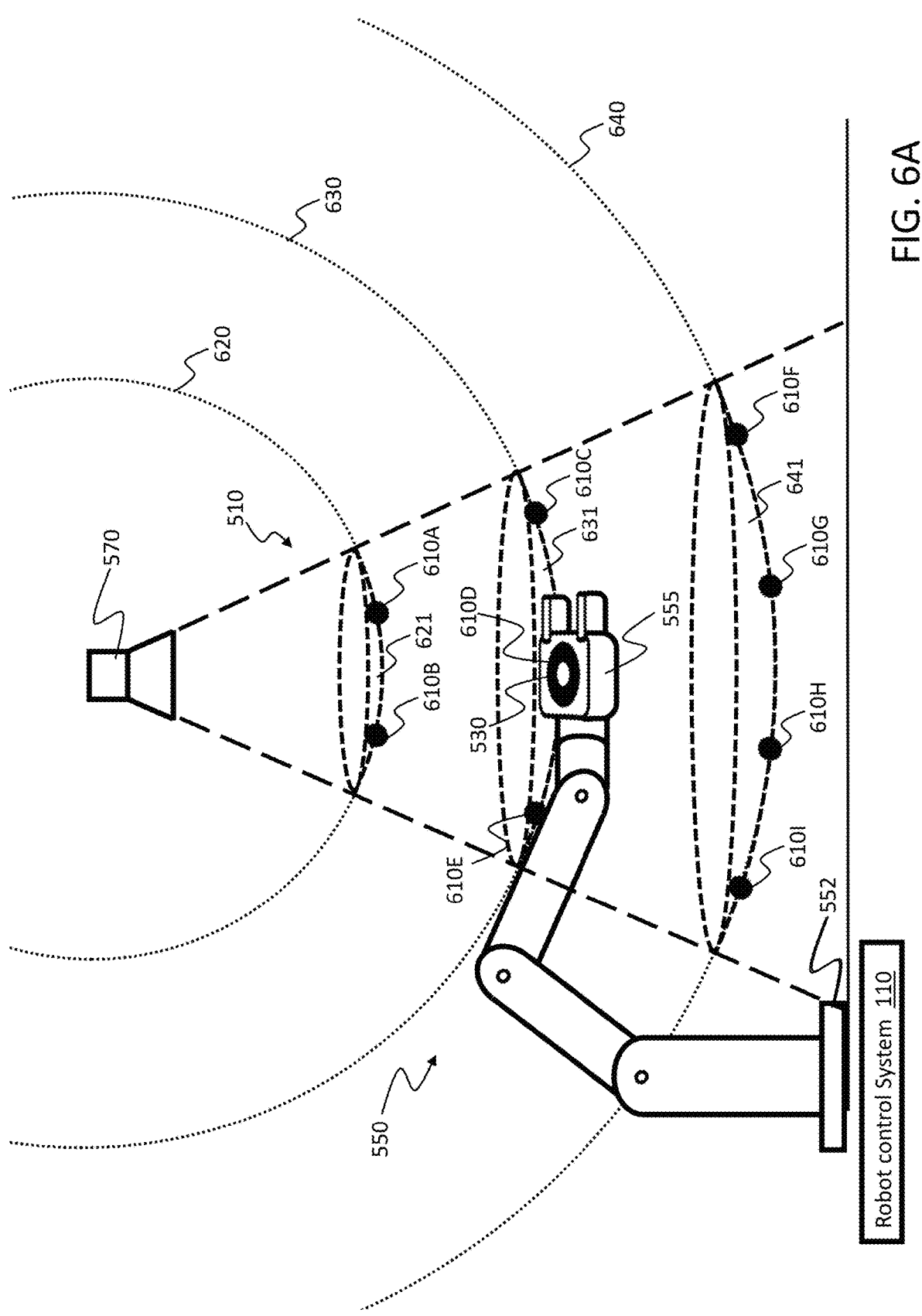
FIGS. 6A-6B depict examples of reference locations at which respective images of a verification symbol is captured, according to an embodiment herein.
Figure 6B:
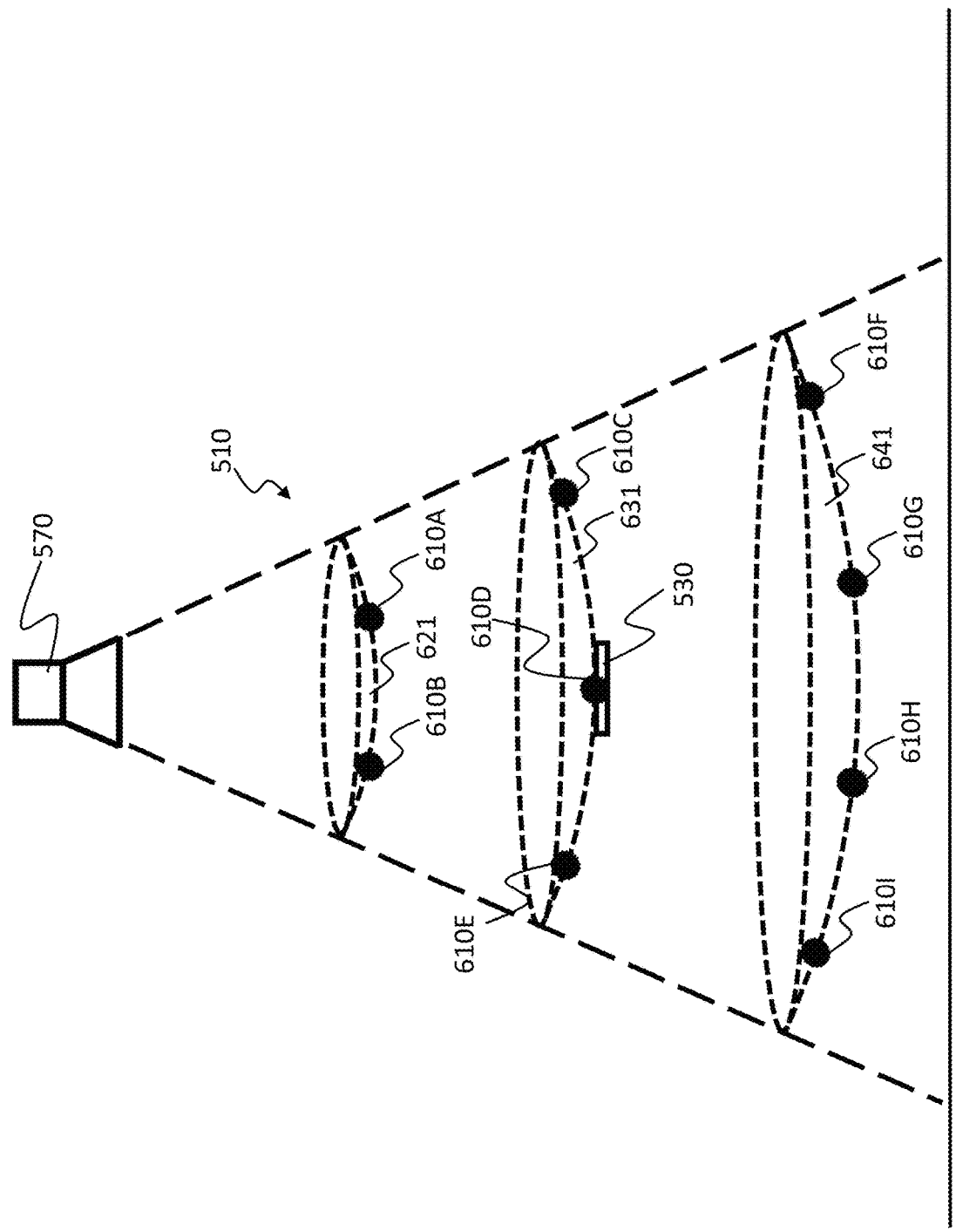

In an embodiment, the one or more reference locations to which the robot arm moves the verification symbol (e.g., 530) may include a plurality of reference locations, wherein each of the plurality of reference locations is a location disposed on a surface of an imaginary sphere that is concave with respect to the camera. In such an embodiment, the control circuit 111 may be further configured to control the robot arm to move the verification symbol to be tangent to the surface of the imaginary sphere at each reference location of the plurality of reference locations. For instance, as illustrated in FIGS. 6A and 6B, the robot control system 110 may control the robot arm of the robot 550 to move the verification symbol 530 to reference locations 610A-610I, and control the camera 570 to capture a respective reference image at each of the reference locations 610A-610I. The reference locations 610A-610I in FIGS. 6A and 6B may be divided among a plurality of imaginary spheres within the camera field of view 510. The reference locations 610A and 610B may be disposed on a first spherical surface 621 of a first imaginary sphere 620, where the first spherical surface 621 is within the camera field of view 510. The reference locations 610C, 610D, and 610E may be disposed on a second spherical surface 631 of a second imaginary sphere 630, where the second spherical surface 631 is within the camera field of view 510. The reference locations 610F, 610G, 610H, and 610I may be disposed on a third spherical surface 641 of a third imaginary sphere 640, where the third spherical surface 641 is within the camera field of view 510. As illustrated in FIGS. 6A and 6B, the first, second, and third spherical surfaces 621, 631, and 641, respectively, are concave with respect to the camera 570. Although the examples in FIGS. 6A and 6B show three spherical surfaces based on three spheres, a number of different spherical surfaces on which reference locations may be disposed may be greater than three or less than three. In an embodiment, the camera 570 may be a center of each of the imaginary spheres 620, 630, 640.

In an embodiment, as illustrated in FIGS. 6A and 6B, when the verification symbol 530 is moved to a reference location, the robot control system 110 may control the robot arm of the robot 550 (e.g., via a movement command) to position the verification symbol 530 to be tangent to the spherical surface on which the reference location is disposed. For example, FIG. 6B illustrates that the verification symbol 530 is tangent to the second spherical surface 631 at the reference location 610D. More particularly, the verification symbol 530 may be disposed on a flat plane (e.g., on a sticker), and the flat plane of the verification symbol 530 may be tangent to the second spherical surface 631 at the reference location 610D.

In an embodiment, the control circuit 111 is configured to control the robot arm to move the verification symbol (e.g., 530) to directly face the camera when the verification symbol is moved to a reference location. For instance, as illustrated in FIG. 6A, the robot control system 110 may control the robot arm of the robot 550 to move the verification symbol 530 to directly face the camera 570 when the verification symbol 530 is moved to the reference location 610D. In this example, the robot control system 110 may control the robot hand 555 to be rotated such that the verification symbol 530 directly faces the camera 570. In some cases, the verification symbol may directly face the camera 570 by being tangent to a spherical surface at the camera field of view 510. When the verification symbol 530 directly faces the camera 570, the camera 570 may be able to photograph the verification symbol 530 head-on, so that there is no perspective effect or a reduced perspective effect in a resulting image of the verification symbol 530.

Figure 5C:
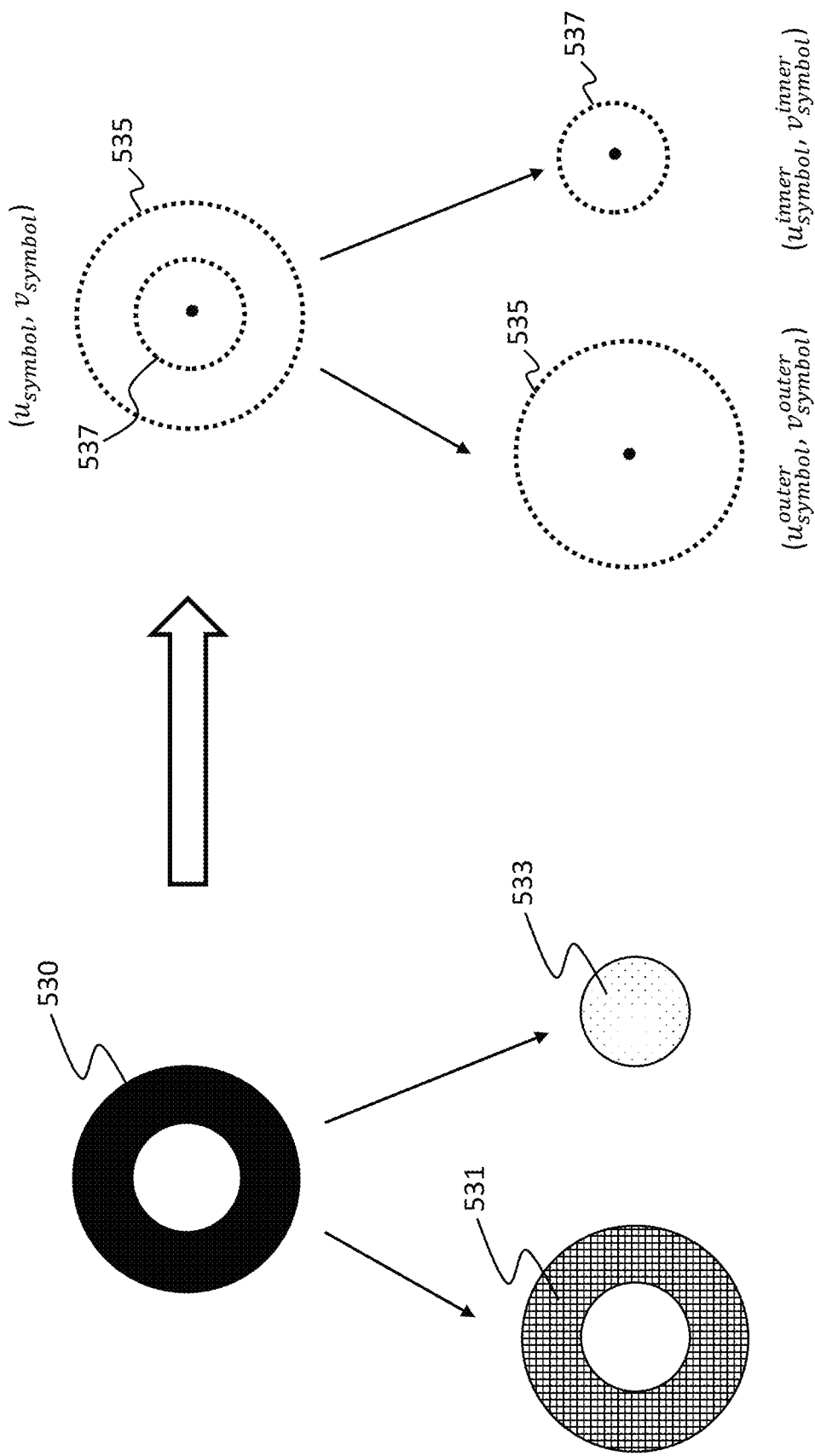
FIG. 5C depicts an example verification symbol, according to an embodiment herein.

In an embodiment, the verification symbol (e.g., 530) includes a first region having a first color and a second region having a second color, wherein a ratio of an area of the first region to an area of the second region is defined and stored on a non-transitory computer-readable medium (e.g., storage device) of the robot control system 110. In such an embodiment, the control circuit 111 may be configured to identify the verification symbol in a reference image or a verification image based on the defined ratio. For instance, as illustrated in FIG. 5C, the verification symbol 530 may include a first region 531 that is ring-shaped and has a first color (e.g., black region), and includes a second region 533 (e.g., white region) enclosed by the first region 531 and having a second color. The ratio of an area of the first region 531 in black to an area of the second region 533 in white in the verification symbol 530 may be a distinct, defined value. By analyzing the colors within a captured image, the robot control system 110 may be capable of identifying a portion of the image that corresponds to the verification symbol 530 by determining whether that portion has a ring-shaped region that encloses a circular region, and whether a ratio between an area of the ring-shaped region and an area of the circular region matches the defined ratio This may allow the robot control system 110 to distinguish the verification symbol 530 from other features captured in an image. For example, as illustrated in FIG. 5A, the robot 550 may be set to utilize the third robot hand 559 that has a combination of a calibration pattern 527 and a verification symbol 530. In this example, a reference image may show both the verification symbol 530 and the calibration pattern 527. In this example, the calibration pattern 527 may not have any ring pattern, or may have ring patterns with a different ratio than the defined ratio discussed above. The control circuit 111 may determine whether a portion of the reference image is the verification symbol 530 or the calibration pattern 527 by determining whether the portion of the reference image has a first image region having the first color and has a second image region having the second color, and whether a ratio between an area of the first image region and an area of the second image region is equal to the defined ratio.

In some cases, the robot control system 110 may determine whether a particular portion of a captured image has a first region with a first color and a second region with a second color, and whether a ratio between an area of the first region and an area of the second region is within a defined range. In one example, if the defined ratio is 1.5, then the robot control system 110 may determine that the particular region corresponds to the verification symbol 530 if the ratio in the particular region falls within a range between 1.4 and 1.6. The two colors of the first and second regions are not limited to black and white colors and may be any two different colors that can be distinguishable by the robot control system 110.

In an aspect, the verification symbol (e.g., 530) may include a first shape and a second shape that are concentric with each other, wherein respective centers of the first shape and the second shape are at substantially the same location. For instance, the verification symbol may be shaped as a circular ring, which includes a first circle and a second circle that are concentric with each other. More specifically, as illustrated in FIG. 5C, the verification symbol 530 may include a first shape 535 (e.g., outer circle) and a second shape 537 (e.g., inner circle). The first shape 535 and the second shape 537 may be concentric to each other, such that a center of the first shape 535 and a center of the second shape 537 are at substantially at the same location. For example, if a center of the first shape 535 is at a coordinate $(u_{symbol}^{outer}, v_{symbol}^{outer})$ and a center of the second shape 537 is at a coordinate $(u_{symbol}^{inner}, v_{symbol}^{inner})$, the coordinate $(u_{symbol}^{outer}, v_{symbol}^{outer})$ and the coordinate $(u_{symbol}^{inner}, v_{symbol}^{inner})$ may be substantially the same.

Returning to FIG. 4A, the method 400 may further include step 407, in which the control circuit 111 determines a reference image coordinate for the verification symbol, the reference image coordinate being a coordinate at which the verification symbol (e.g., 530) appears in the reference image. For instance, as illustrated in FIG. 6A, an image of the verification symbol 530 may be captured at the reference location 610D, and may be used as the reference image. The verification symbol 530 may appear within the reference image at a particular coordinate, which may be referred to as a reference image coordinate.

In an embodiment, as discussed above, the verification symbol (e.g., 530) may include a first shape and a second shape that are concentric with each other, wherein respective centers of the first shape and the second shape are at substantially the same location. In such an embodiment, the control circuit 111 in step 407 may be configured to determine the reference image coordinate for such a verification symbol by: determining a first coordinate of a center of the first shape in the reference image, determining a second coordinate of a center of the second shape in the reference image, and determining the reference image coordinate as an average of the first coordinate and the second coordinate in the reference image.

Figure 7B:
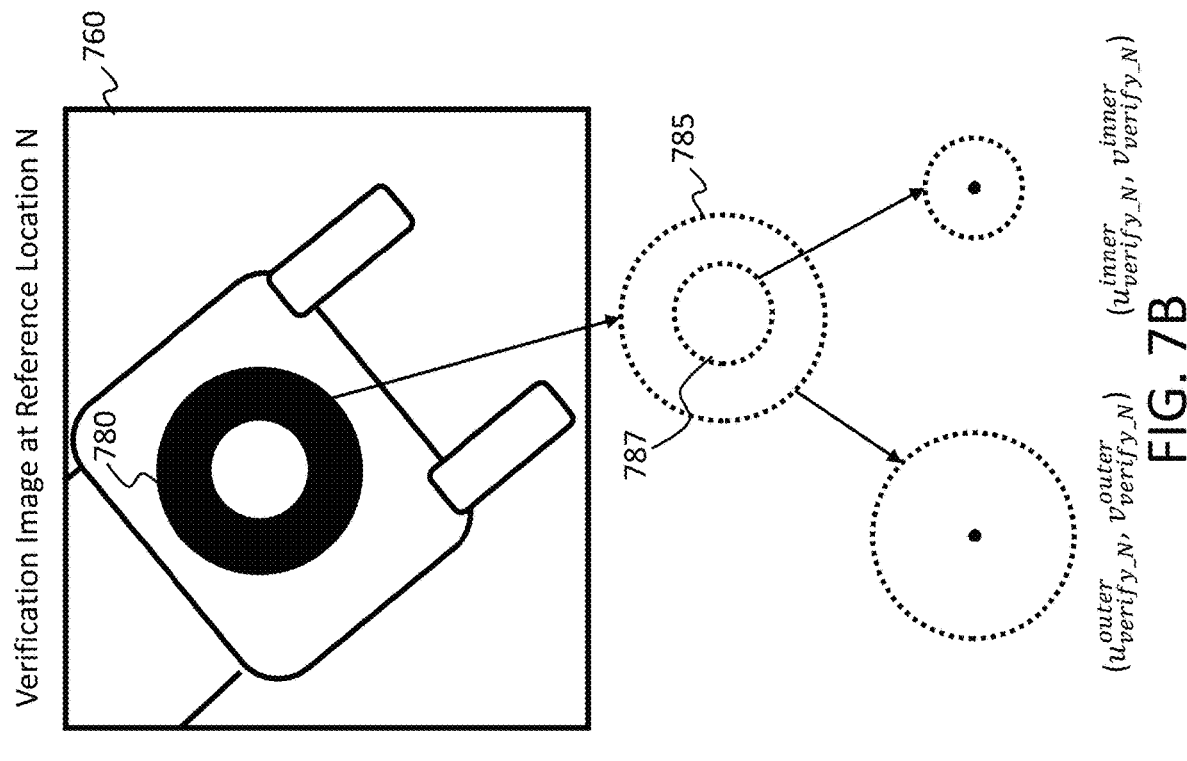
FIG. 7B depicts an example of determining a verification image coordinate, according to an embodiment herein.
Figure 7A:
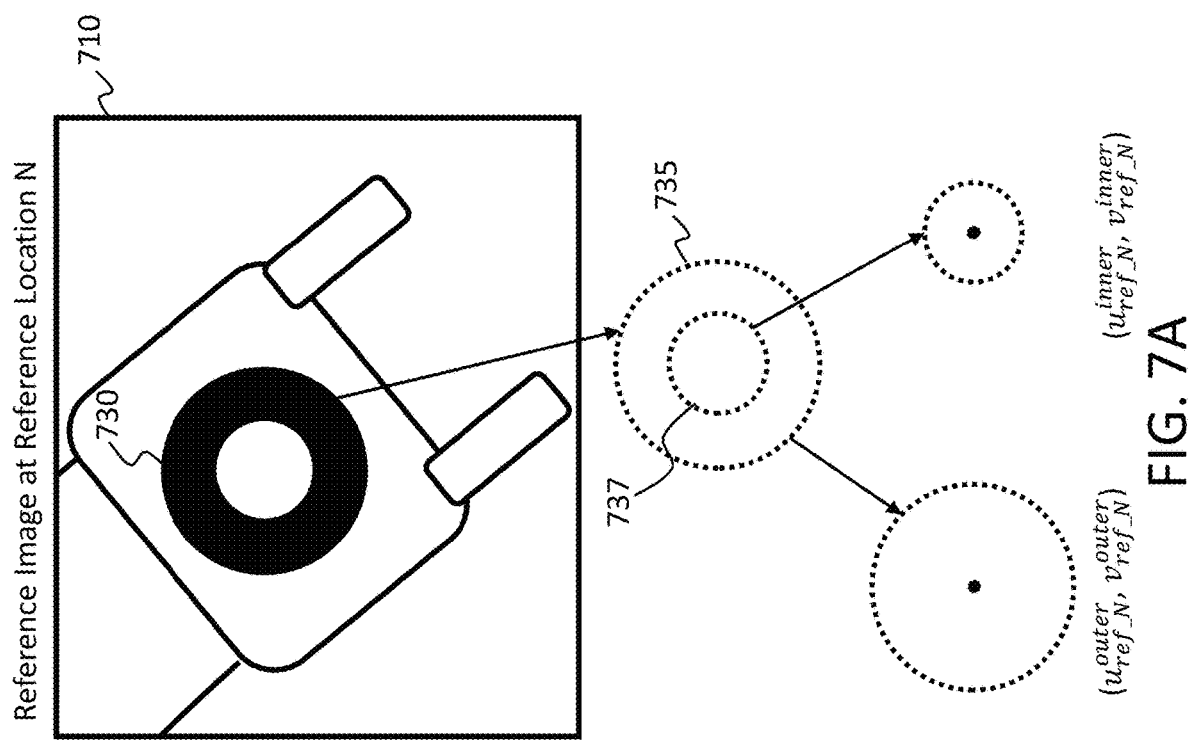
FIG. 7A depicts an example of determining a reference image coordinate, according to an embodiment herein.

For instance, FIG. 7A shows a reference image 710 captured at a reference location N (where N is an integer) of the reference locations. The reference image 710 includes a verification portion 730, which is an image portion in the reference image 710 showing the verification symbol 530 of FIG. 5A, 5B, or 5C. The robot control system 110 of FIG. 1A or 1B may be configured to identify, from the verification portion 730, a first shape 735 (e.g., outer circle) that is the same as or substantially the same as the first shape 535 of the verification symbol 530 of FIG. 5C. The robot control system 110 may be configured to further identify, from the verification portion 730, a second shape 737 (e.g., inner circle) that is the same or substantially the same as the second shape 537 of the verification symbol 530 in FIG. 5C. Subsequently, for the reference location N, the robot control system 110 may determine a first coordinate $(u_{ref\_N}^{outer}, v_{ref\_N}^{outer})$ of a center of the first shape 735 (i.e., a center coordinate of the first shape 735) shown in the reference image 710 and a second coordinate $(u_{ref\_N}^{inner}, v_{ref\_N}^{inner})$ of a center of the second shape 737 (i.e., a center coordinate of the second shape 737) shown in the reference image 710. To determine the reference image coordinate $(u_{ref\_N}, v_{ref\_N})$ for the reference image 710 as a whole, wherein the reference image 710 corresponds with the verification symbol 530 being at reference location N, the robot control system 110 may calculate an average of the first coordinate $(u_{ref\_N}^{outer}, v_{ref\_N}^{outer})$ and the second coordinate $(u_{ref\_N}^{inner}, v_{ref\_N}^{inner})$ in the reference image 710, as follows:

$$(u_{ref\_N}, v_{ref\_N}) = \left( \frac{u_{ref\_N}^{outer} + u_{ref\_N}^{inner}}{2}, \frac{v_{ref\_N}^{outer} + v_{ref\_N}^{inner}}{2} \right)$$

In an embodiment, the reference image coordinate for the verification symbol may be its center coordinate, and determining the center coordinate of the verification symbol 530 based on the respective center coordinates of the first shape 735 and the second shape 735 may improve a robustness of the verification process against image noise. For instance, image noise may introduce error in the determination of a center coordinate for the first shape 735, but not to the determination of the center coordinate for the second shape 737. In some cases, the second shape 737 may have may in reality share the same center location as the first shape 735, but image noise may cause the center coordinate of the second shape 737 to appear in an image to be different than the center coordinate of the first shape 735. In this scenario, simply using the center coordinate of the second shape 737 as the center coordinate of the verification symbol 530 may lead to an undesirable amount of error. The amount of error may be reduced by using an average of the center coordinate for the first shape 735 and the center coordinate for the second shape 737 as the center coordinate of the verification symbol 530.

In an embodiment, the one or more reference locations discussed above may be a plurality of reference locations that respectively correspond with a plurality of reference image coordinates. In this embodiment, the reference image coordinate may be one of the plurality of reference image coordinates. For instance, as illustrated in FIGS. 6A and 6B, there may be multiple reference locations such as the reference locations 610A-610I to which the verification symbol 530 is moved or otherwise placed. For each of the reference locations 610A-610I of the verification symbol 530, the robot control system 110 may retrieve or otherwise receive a respective reference image captured by the camera 570 of the verification symbol 530 at that location, and may determine a respective reference image coordinate that indicates where the verification symbol 530 appears in the respective reference image.

Returning to FIG. 4A, the method 400 may further include step 409, in which the control circuit 111 controls, based on the camera calibration information, movement of the robot arm to perform a robot operation. In an embodiment, this step may involve the control circuit 111 generating a second movement command that is based on the camera calibration information, and outputting the second movement command to the communication interface 113. The communication interface 113 may in turn communicate the second movement command to the robot to control movement of the robot arm. For instance, as illustrated in FIG. 5A, after the first camera calibration, the robot control system 110 controls the robot 550 to perform a robot operation involving robot tasks, such as picking up objects 582A, 582B, and 582C. The movement of the robot 550 may be based on the camera calibration information obtained from the first camera calibration and based on images of the objects 582A, 582B, 582C captured by the camera 570.

In step 411, the control circuit 111 detects an idle period during the robot operation. In an aspect, the idle period of robot may be a time period during which the robot is free from performing a robot task during the robot operation. In some cases, if the robot operation is based on picking up objects from the conveyor belt 573, the idle period may be based on an absence of objects on the conveyor belt 573. More specifically, the conveyor belt 573 may be reachable by the robot arm, and the control circuit 111 is configured to detect the idle period by detecting that there are no objects on the conveyor belt 573, or that a distance between the robot 550 and a closest object on the conveyor belt 573 exceeds a defined distance threshold. In some cases, the control circuit 111 may receive a signal indicating that an idle period is about to occur, where the signal may be received from another device or component monitoring the robot operation. For instance, as illustrated in FIG. 5A, the robot control system 110 may detect an idle period between a robot task involving picking up the second object 582B and a robot task involving picking up the third object 582C during the robot operation because a large distance exists between the second object 582B and the third object 582C. During this idle period, after the robot 550 picks up the second object 582B, it may have an idle period during which it is free from performing a robot task, because the object 582C is not yet reachable by the robot 550. In one example, the robot control system 110 may detect the idle period when no object on the conveyor belt 573 is reachable by the robot 550 and/or when the robot control system 110 determines that a distance between the robot 550 and the closest object (e.g., third object 582C) upstream on the conveyor belt 573 exceeds a certain threshold.

Returning to FIGS. 4A and 4B, the method 400 may further include a step 451, in which the control circuit 111 controls the robot arm to move the verification symbol 530, during the idle period, to at least the reference location that was used in step 403 (which was used to capture the reference image). In an embodiment, step 451 may involve the control circuit 111 generating a third movement command, and outputting the third movement command to the communication interface 113. The communication interface 113 may be configured to then communicate the third movement to the robot to cause the robot arm to move based on the movement command. In some cases, the third movement command may involve a set of stored motor commands that correspond to the reference location. In some cases, the third movement command may be generated based on the camera calibration information from step 401. In other cases, the third movement command in step 451 does not rely on the camera calibration information from step 401.

In step 453, the control circuit 111 retrieves or otherwise receives an additional image of the verification symbol (e.g., 530) from the camera (e.g., 570) during the idle period, wherein the additional image is a verification image for the verification, and is an image of the verification symbol at least at the reference location during the idle period. That is, the verification image for the reference location is captured while the verification symbol (e.g., 530) is or was at the reference location. In an embodiment, step 453 involves the control circuit 111 generating a camera command that controls the camera (e.g., 570) to capture the verification image. The control circuit 111 may output the camera command to the communication interface 113, which may communicate the camera command to the camera (e.g., 570). In an embodiment, step 451 may involve controlling the robot arm to move the verification symbol to multiple reference locations, and receiving multiple respective verification images captured by the camera. For instance, as illustrated in FIGS. 6A and 6B, during an idle period, the robot control system 110 may control the robot arm of the robot 550 to move the verification symbol 530 to one of the reference locations 610A-610I and capture an image of the verification symbol 530 at the location as a verification image. If the idle period is not yet over, or more specifically if a sufficient amount of time remains in the idle period, the robot control system 110 may control the robot arm of the robot 550 to move the verification symbol 530 to another one of the reference locations 610A-610I and capture an image of the verification symbol 530 at that other location as another verification image. If the idle period ends, the robot control system 110 may stop capturing verification images. As such, during each idle period, the robot control system 110 may control the robot arm of the robot 550 to move the verification symbol 530 to one or more of the reference locations 610A-610I and capture a verification image at each of the one or more of the reference locations 610A-610I.

Returning to FIG. 4B, the method 400 may further include step 455, in which the control circuit 111 determines a verification image coordinate used for the verification, the verification image coordinate being a coordinate at which the verification symbol appears in the verification image. If the verification symbol (e.g., 530) is moved to a plurality of reference locations (e.g., 610A-610I), the camera (e.g., 570) may capture a plurality of verification images that respectively correspond with the plurality of reference locations, and the control circuit 111 may determine a plurality of verification image coordinates that respectively correspond with the plurality of verification images and respectively correspond with the plurality of reference locations. The plurality of verification images may be all captured by the camera (e.g., 570) in a single idle period (e.g., if the single idle period is sufficiently long to allow the robot arm to move the verification symbol (e.g., 530) to all of the reference locations 610A-610I), or in several different idle periods (e.g., if each of the idle periods is not long enough for the robot arm to move the verification symbol 530 to all of the reference locations 610A-610I).

In an embodiment, the verification image coordinate may be determined in a manner similar to that for the reference image coordinate. For instance, the verification image coordinate may be a center coordinate of the verification symbol (e.g., 530), and may be determined as an average of a center coordinate of a first shape of the verification symbol (e.g., 530) and a center coordinate of a second shape of the verification symbol in the verification image (e.g., 760). For instance, FIG. 7B shows a verification image 760 captured at the reference location N of the reference locations. The verification image 760 shows a verification portion 780, which is an image portion in the verification image 760 showing the verification symbol 530. The robot control system 110 may identify, from the verification portion 780, a first shape 785 that is the same as or substantially the same as the first shape 585 of the verification symbol 530 of FIG. 5C. The robot control system 110 may further identify, from the verification portion 780, a second shape 787 that is the same or substantially the same as the second shape 587 of the verification symbol 530. Further, the robot control system 110 may be configured to determine a center coordinate $(u_{verify\_N}^{outer}, v_{verify\_N}^{outer})$ of the first shape 785 shown in the verification portion 780 of the verification image 760, and determine a center coordinate $(u_{verify\_N}^{inner}, v_{verify\_N}^{inner})$ of the second shape 787 shown in the verification portion 780 of the verification image 760. The robot control system 110 may further determine the verification image coordinate $(u_{verify\_N}, v_{verify\_N})$ for the verification image 760 as an average of the center coordinate of the first shape 785 and the center coordinate of the second shape 787 in the verification image 760, as follows:

$$(u_{verify\_N}, v_{verify\_N}) = \left( \frac{u_{verify\_N}^{outer} + u_{verify\_N}^{inner}}{2}, \frac{v_{verify\_N}^{outer} + v_{verify\_N}^{inner}}{2} \right)$$

Returning to FIG. 4B, the method 400 may further include step 457, in which the control circuit 111 determines a deviation parameter value based on an amount of deviation between the reference image coordinate of step 403 and the verification image coordinate of step 455, wherein the reference image coordinate and the verification image coordinate are both associated with the reference location N. In one example, the deviation between the reference image coordinate and the verification image coordinate may be a distance between the reference image coordinate and the verification image coordinate. For instance, given that the reference image coordinate at the reference location N is expressed as $(u_{ref\_N}, v_{ref\_N})$ and the verification image coordinate at the reference location N is expressed as $(u_{verify\_N}, v_{verify\_N})$, a deviation (e.g., distance) at the reference location N may be expressed as $\sqrt{(u_{ref\_N} - u_{verify\_N})^2 + (v_{ref\_N} - v_{verify\_N})^2}$.

As discussed above, in an aspect where the one or more reference locations are a plurality of reference locations, the control circuit 111 may be configured to determine the plurality of verification image coordinates respectively corresponding to the plurality of reference locations, where the verification image coordinate discussed above is one of the plurality of verification image coordinates. In such an aspect, the deviation parameter value is based on respective amounts of deviation between the plurality of reference image coordinates and the plurality of verification image coordinates for the plurality of reference locations, wherein each amount of deviation of the respective amounts of deviation is between: (a) a reference image coordinate corresponding to a respective reference location of the plurality of reference locations, and (b) a verification image coordinate corresponding to the same reference location.

The plurality of verification image coordinates may be respective coordinates at which the verification symbol appears in a plurality of verification images, the verification image discussed above being one of the plurality of verification images. The control circuit 111 may be configured to control the camera to capture all of the plurality of verification images in one idle period, and/or may be configured to control the camera to capture the plurality of verification images in different idle periods.

For instance, when there are multiple reference locations, as shown in FIGS. 6A and 6B, the robot control system 110 may determine a plurality of respective reference image coordinates corresponding to the plurality of reference locations, and determine a plurality of respective verification image coordinates corresponding to the plurality of reference locations, and determine respective amounts of deviation between the plurality of reference image coordinates and the plurality of verification image coordinates. The deviation parameter value may be based on the respective amounts of deviation between the plurality of reference image coordinates and the plurality of verification image coordinates. For instance, the deviation parameter may be an average of the respective amounts of deviation, as follows.

$$\text{deviation parameter} = \frac{\sum_{N=1}^{M} \sqrt{(u_{ref\_N} - u_{verify\_N})^2 + (v_{ref\_N} - v_{verify\_N})^2}}{M}.$$

In the above expression, N may refer to the Nth reference location, while M may refer to a total number of reference locations.

Returning to FIG. 4B, the method 400 may further include step 459, in which the control circuit 111 determines whether the deviation parameter value exceeds a defined threshold (which may also be referred to as a defined deviation threshold). Further, in step 461, the control circuit 111 may, in response to a determination that the deviation parameter value exceeds the defined threshold, perform a second camera calibration to determine updated camera calibration information for the camera. For instance, the deviation parameter value exceeding the defined threshold may indicate that the camera calibration information of the camera is outdated and/or is likely to cause an undesirable amount of errors in a robot operation. Hence, if the deviation parameter value exceeds the defined threshold, a second camera calibration for the camera may be performed to update the camera calibration information for the camera (e.g., 570). The second camera calibration may use the same techniques as the first camera calibration, but may be based on images that are more recently captured by the camera. In an example, the robot operation may be stopped or paused if step 459 indicates that the deviation parameter value exceeds the defined threshold, and then proceed to perform the second camera calibration, which may begin by capturing images for the second camera calibration. After the second camera calibration is complete and the camera calibration information for the camera is updated, the robot control system 110 may resume the robot operation using the updated camera calibration information.

In an embodiment, the control circuit 111 may be configured, in response to a determination that the deviation parameter value does not exceed the defined threshold, to control the robot to continue the robot operation after the idle period without performing additional camera calibration (e.g., by outputting a fourth movement command to the robot via the communication interface). Such a condition may indicate that the camera calibration information from step 401 is still sufficiently accurate, and that robot operation can continue without experiencing an undesirable amount of errors.

In an embodiment, the control circuit 111 may be configured to determine a temperature of an environment in which the robot is located, and to adjust at least one of the defined deviation threshold (also referred to as re-defining the deviation threshold) or the camera calibration information for the camera based on the measured temperature. For example, the control circuit 111 may determine the temperature of the environment by measuring the temperature or receiving temperature data from another device or component. In such an embodiment, the control circuit 111 may be configured to adjust the defined threshold based on the measured temperature by: setting the defined threshold to have a first value when the measured temperature is outside of a defined range, and setting the threshold to a have a second value lower than the first value when the measured temperature is within the defined range. For instance, an excessively high temperature or an excessively low temperature may cause changes in the camera. More specifically, a temperature change may affect the intrinsic parameters of the camera. For example, components in the camera may expand when the temperature increases and may contract when the temperature decreases, which may affect the intrinsic parameters of the camera. Therefore, it may be advantageous to adjust the defined deviation threshold based on the temperature or amount of temperature change. For example, when the temperature is within a range of a normal operating temperature (e.g., a defined range based around room temperature), then the defined deviation threshold may be lower, because the temperature does not adversely affect the camera. On the other hand, when the temperature is outside the range of a normal operating temperature, the deviation threshold may be higher because a cold or hot temperature adversely affects the camera. In an alternative example, the deviation threshold may be defined to a lower value when the temperature is outside of a normal operating temperature, so as to more frequently trigger additional camera calibration. In this example, the deviation threshold may be defined to a higher value when the temperature is within the normal operating temperature, so as to less frequently trigger additional camera calibration.

Figure 8:
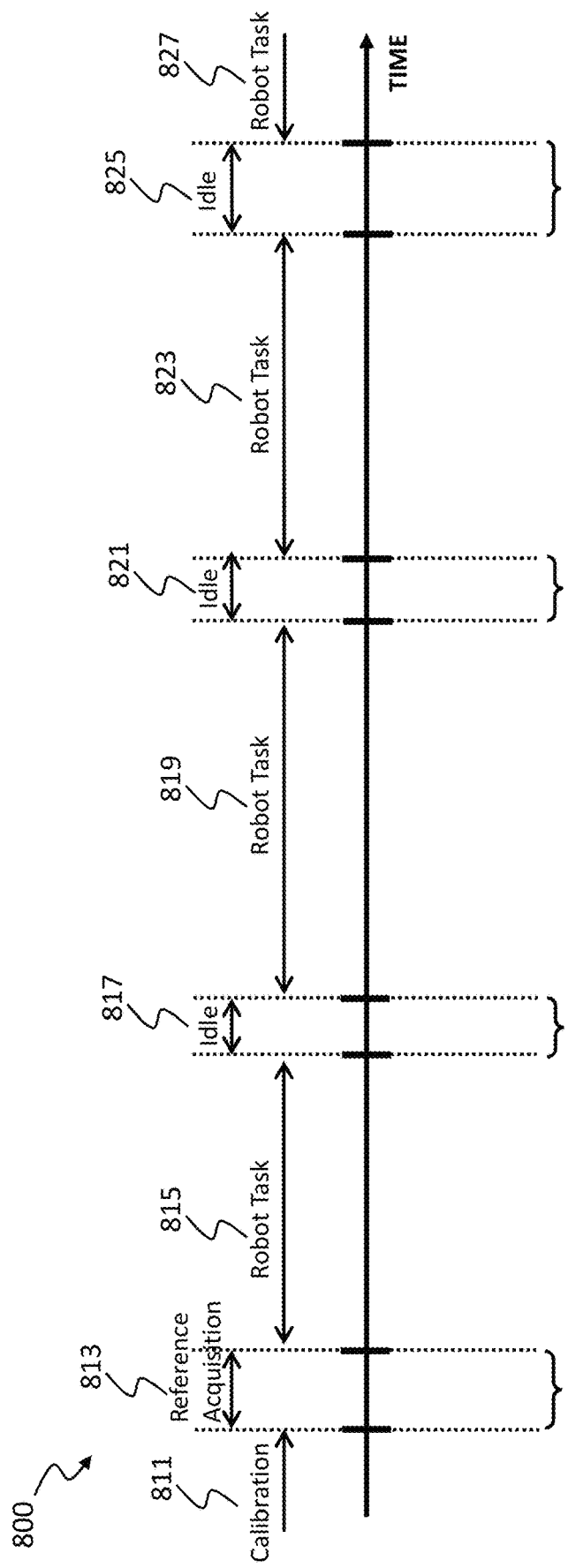
FIG. 8 illustrates an example time line for verification of camera calibration, according to an embodiment herein.

FIG. 8 depicts an example time line 800 where the camera calibration and the verification of the camera calibration are performed. Before a robot operation begins, the robot control system 110 of FIG. 1A or 1B performs the first camera calibration to determine camera calibration information for the camera (e.g., camera 570 of FIG. 5A or 5B) during a calibration period 811. After the first camera calibration is complete, the robot control system 110 captures reference images of the verification symbol (e.g., verification symbol 530) at various reference locations and determines reference image coordinates at which the verification symbol appears in respective reference images (e.g., reference image 710 of FIG. 7A), during a reference acquisition period 813. The robot operation may begin after the reference acquisition period 813 ends upon determining the reference image coordinates.

After the robot operation begins, during a task period 815, the robot control system 110 controls the robot (e.g., robot 550 of FIG. 5A or 5B) to perform one or more robot tasks and thus, in an embodiment, may not be able to collect verification images (e.g., verification image 760 of FIG. 7B). The robot control system 110 detects an idle period 817 during which the robot is free from performing a robot task after the task period 815. Hence, during the idle period 817, the robot control system 110 captures one or more verification images of the verification symbol at a first set of one or more locations (e.g., 610A-610B) of the reference locations, respectively. After the idle period 817 ends, during a task period 819, the robot control system 110 resumes controlling the robot to perform one or more robot tasks and thus may not collect verification images. The robot control system 110 detects an idle period 821 during which the robot is free from performing a robot task, after the task period 817. During the idle period 821, the robot control system 110 captures one or more verification images of the verification symbol at a second set of one or more locations (e.g., 610C-610E) of the reference locations, respectively. After the idle period 821, during a robot task period 823, the robot control system 110 resumes controlling the robot to perform one or more robot tasks and thus may not collect verification images. The robot control system 110 detects an idle period 825 during which the robot is free from performing a robot task after the task period 823. During the idle period 825, the robot control system 110 captures one or more verification images of the verification symbol at a third set of one or more locations (e.g., 610E-610I) of the reference locations, respectively.

The verification images (e.g., 760) captured during the idle periods 817, 821, and 825 may be captured at different respective locations of the reference locations. For instance, the first set, second set, and third set of one or more locations may be different from each other, and may have no overlap in locations. Further, during the idle period 825, the robot control system 110 may determine that the verification image capture is complete, which may indicate that a sufficient number of verification images are captured for verification of the camera calibration. In one embodiment, the robot control system 110 may determine that the verification image capture is complete if verification images are captured at all of the reference locations (e.g., 610A-610I). In one embodiment, the robot control system 110 may determine that the verification image capture is complete if a number of the verification images reaches a defined target count.

Upon determining that the verification image capture is complete, the robot control system 110 determines the verification image coordinates at which the verification symbol appears in the respective verification images. Subsequently, the robot control system 110 determines a deviation parameter value based on respective amounts of deviation of the verification image coordinates from the reference image coordinates. If the deviation parameter exceeds a defined threshold, the robot control system 110 performs another camera calibration. In this example, however, the deviation parameter does not exceed the defined threshold, and thus the robot control system 110 continues performing a robot task during a task duration 827 after the idle period 825, without performing additional camera calibration.

Figure 9:
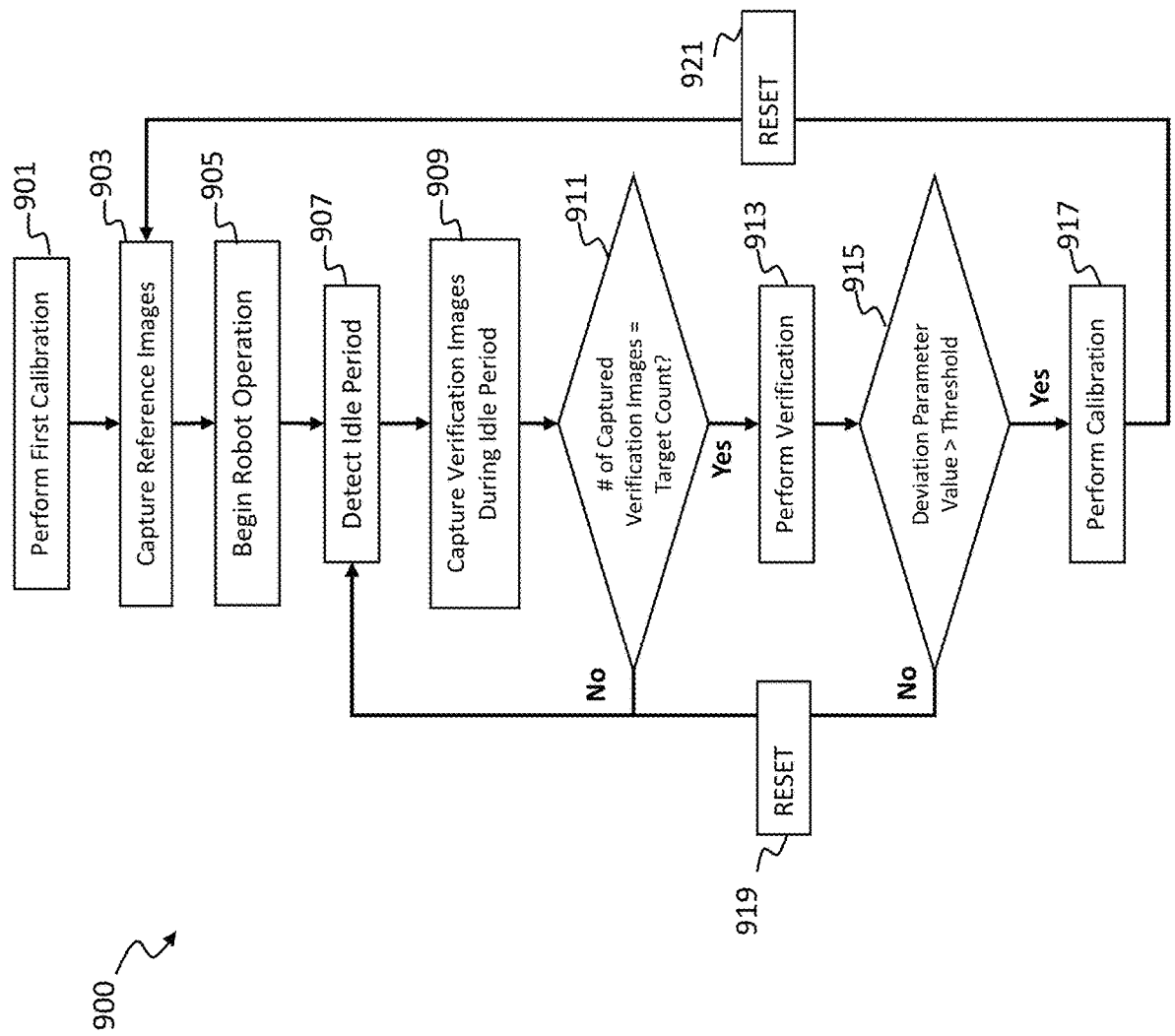
FIG. 9 provides a flow diagram that illustrates an example method for performing verification of camera calibration, according to an embodiment herein.

FIG. 9 depicts an example flow diagram 900 that shows a verification process related to the timeline in FIG. 8. At step 901, the robot control system 110 of FIG. 1A, 1B, or 1C performs the first camera calibration of the camera (e.g., camera 570 of FIG. 5A or 5B) to determine camera calibration information of the camera. At step 903, the robot control system 110 controls the robot (e.g., robot 550 of FIG. 5A or 5B) to move the verification symbol (e.g., verification symbol 530 of FIG. 5A or 5B) to reference locations and captures, via the camera, respective instances of the reference images (e.g., reference image 710 of FIG. 7A) of the verification symbol at respective reference locations. At step 905, the robot control system 110 begins a robot operation of the robot based on the camera calibration information obtained from the first camera calibration.

At step 907, the robot control system 110 detects an idle period during the robot operation. At step 909, the robot control system 110 controls the robot (e.g., robot 550 of FIG. 5A or 5B) to move the verification symbol (e.g., verification symbol 530 of FIG. 5A or 5B) to one or more locations of the reference locations during the idle period and captures, via the camera, one or more verification images (e.g., verification image 760 of FIG. 7B) respectively at the one or more locations of the reference locations. In some cases, the robot control system 110 may control the robot to move the verification symbol to as many reference locations as is permitted by a duration of the idle period. At step 911, the robot control system 110 determines whether a total number of the captured verification images has reached a defined target count. If the total number of the captured verification images has not reached the target count, the robot control system 110 attempts to detect another, subsequent idle period during the robot operation, by returning to step 907, to capture more verification images.

If the total number of the captured verification images has reached the target count, at step 913, the robot control system 110 performs verification of the camera calibration based on the reference images (e.g., 710) and the verification images (e.g. 760). The verification of the camera calibration produces a deviation parameter. At step 915, the robot control system 110 determines whether the deviation parameter exceeds a defined threshold. If the deviation parameter does not exceed the threshold, the robot control system 110 may reset the total number of captured verification images to zero at step 919 and may continue the robot operation after the idle period while attempting to detect another idle period to capture a new set of verification images, by returning to step 907.

If the deviation parameter exceeds the threshold, the robot control system 110 may stop the robot operation and perform a second camera calibration, at step 917. After the second camera calibration at 917, the robot control system 110 may reset the total number of captured verification images to zero at 921. After step 921, the flow diagram may return to step 903, where the robot control system 110 controls the robot (e.g., 550) to move the verification symbol (e.g., 530) to the reference locations and captures, via the camera (e.g., 570), a new set of reference images (e.g., 710) of the verification symbol at the respective reference locations, such that the new set of reference images may be used for verification later.

Additional Discussion of Various Embodiments

Embodiment 1 relates to a robot control system comprising a communication interface configured to communicate with a robot having a base and a robot arm with a verification symbol disposed thereon, and to communicate with a camera having a camera field of view. The robot control system further comprises a control circuit configured to perform a first camera calibration to determine camera calibration information associated with the camera. The control circuit is further configured: a) to control the robot arm to move the verification symbol, during or after the first camera calibration, to a location within the camera field of view by outputting a first movement command to the robot via the communication interface, the location being a reference location of one or more reference locations for verification of the first camera calibration, b) to receive an image of the verification symbol from the camera via the communication interface, wherein the camera is configured to capture the image of the verification symbol at the reference location, the image being a reference image for the verification, c) to determine a reference image coordinate for the verification, the reference image coordinate being a coordinate at which the verification symbol appears in the reference image; d) to control, based on the camera calibration information, movement of the robot arm to perform a robot operation by outputting a second movement command that is based on the camera calibration information to the robot via the communication interface; e) to detect an idle period during the robot operation; f) to control the robot arm to move the verification symbol to at least the reference location during the idle period by outputting a third movement command to the robot via the communication interface; g) to receive an additional image of the verification symbol from the camera via the communication interface during the idle period, wherein the camera is configured to capture the additional image of the verification symbol at least at the reference location, the additional image being a verification image for the verification; h) to determine a verification image coordinate used for the verification, the verification image coordinate being a coordinate at which the verification symbol appears in the verification image; i) to determine a deviation parameter value based on an amount of deviation between the reference image coordinate and the verification image coordinate, the reference image coordinate and the verification image coordinate both associated with the reference location, wherein the deviation parameter value is indicative of a change in the camera since the first camera calibration or of a change in a relationship between the camera and the robot since the first camera calibration, i) to determine whether the deviation parameter value exceeds a defined threshold, and j) in response to a determination that the deviation parameter value exceeds the defined threshold, to perform a second camera calibration to determine updated camera calibration information.

Embodiment 2 includes the robot control system of embodiment 1, wherein the control circuit is configured, in response to a determination that the deviation parameter value does not exceed the defined threshold, to control the robot to continue the robot operation after the idle period without performing additional camera calibration by outputting a fourth movement command to the robot via the communication interface.

Embodiment 3 includes the robot control system of embodiment 1 or 2, wherein the one or more reference locations are a plurality of reference locations that respectively correspond with a plurality of reference image coordinates, the reference image coordinate being one of the plurality of reference image coordinates. In this embodiment, the control circuit is further configured to determine a plurality of verification image coordinates respectively corresponding to the plurality of reference locations, wherein the verification image coordinate is one of the plurality of verification image coordinates, and wherein the deviation parameter value is based on respective amounts of deviation between the plurality of reference image coordinates and the plurality of verification image coordinates for the plurality of reference locations, wherein each amount of deviation of the respective amounts of deviation is between: (a) a reference image coordinate corresponding to a respective reference location of the plurality of reference locations, and (b) a verification image coordinate corresponding to the same reference location.

Embodiment 4 includes the robot control system of embodiment 3, wherein the plurality of verification image coordinates are respective coordinates at which the verification symbol appears in a plurality of verification images, the verification image being one of the plurality of verification images, and wherein the control circuit is configured to control the camera to capture all of the plurality of verification images in the idle period.

Embodiment 5 includes the robot control system of embodiment 3, wherein the plurality of verification image coordinates are respective coordinates at which the verification symbol appears in a plurality of verification images, the verification image being one of the plurality of verification images, and wherein the control circuit is configured to control the camera to capture the plurality of verification images in different idle periods, the idle period being one of the different idle periods.

Embodiment 6 includes the robot control system of any one of embodiments 1-5, wherein the verification symbol includes a first region having a first color and a second region having a second color, wherein a ratio of an area of the first region to an area of the second region is defined and stored on a storage device of the robot control system as a defined ratio.

Embodiment 7 includes the robot control system of embodiment 6, wherein the control circuit is configured to identify the verification symbol in the reference image or the verification image based on the defined ratio.

Embodiment 8 includes the robot control system of embodiment 7, wherein the robot arm has a calibration pattern disposed thereon, wherein the reference image includes the verification symbol and the calibration pattern, wherein the control circuit is configured to determine whether a portion of the reference image is the verification symbol or the calibration pattern by determining whether the portion of the reference image has a first image region having the first color and has a second image region having the second color, and whether a ratio between an area of the first image region and an area of the second image region is equal to the defined ratio.

Embodiment 9 includes the robot control system of any one of embodiments 1-8, wherein the verification symbol includes a first shape and a second shape that are concentric with each other, wherein respective centers of the first shape and the second shape are at substantially the same location.

Embodiment 10 includes the robot control system of embodiment 9, wherein the control circuit is configured to determine the reference image coordinate by: a) determining a first coordinate of a center of the first shape in the reference image; b) determining a second coordinate of a center of the second shape in the reference image; and c) determining the reference image coordinate as an average of the first coordinate and the second coordinate in the reference image. In this embodiment, the control circuit is configured to determine the verification image coordinate by: d) determining a first coordinate of a center of the first shape in the verification image; e) determining a second coordinate of a center of the second shape in the verification image; and f) determining the verification image coordinate as an average of the first coordinate and the second coordinate in the verification image.

Embodiment 11 includes the robot control system of any one of embodiments 1-10, wherein the control circuit is configured to identify the verification symbol in the reference image or the verification image by identifying a circular ring, the verification symbol being shaped as the circular ring.

Embodiment 12 includes the robot control system of any one of embodiments 1-11, wherein the control circuit is further configured to determine a temperature of an environment in which the robot is located; and to adjust at least one of the defined threshold or the camera calibration information based on the temperature that is measured.

Embodiment 13 includes the robot control system of embodiment 12, wherein the control circuit is configured to adjust the defined threshold based on the temperature by: setting the defined threshold to have a first value when the temperature is outside of a defined range; and setting the threshold to a have a second value lower than the first value when the temperature is within the defined range.

Embodiment 14 includes the robot control system of any one of embodiments 1-13, wherein the one or more reference locations to which the control circuit is configured to cause the verification symbol to be moved via the robot arm include a plurality of reference locations disposed on a surface of a sphere that is concave with respect to the camera.

Embodiment 15 includes the robot control system of embodiment 14, wherein the control circuit is further configured to control the robot arm to move the verification symbol to be tangent to the surface of the sphere at each reference location of the plurality of reference locations.

Embodiment 16 includes the robot control system of any one of embodiments 1-15, wherein the control circuit is configured to control the robot arm to move the verification symbol to directly face the camera when the verification symbol is moved to the reference location.

Embodiment 17 includes the robot control system of any one of embodiments 1-16, wherein the control circuit is configured to detect the idle period of the robot operation by detecting a time period during which the robot is free from performing a robot task during the robot operation.

Embodiment 18 includes the robot control system of embodiment 17, wherein the control circuit is configured to control the robot arm to interact with objects on a conveyor belt that is reachable by the robot arm, wherein the control circuit is configured to detect the idle period by detecting the conveyor belt having no object thereon, or detecting that a distance between the robot and a closest object on the conveyor belt exceeds a defined distance threshold.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A computing system comprising:
a communication interface configured to communicate with a robot having a verification symbol disposed thereon, and to communicate with a camera; and
a control circuit configured
to output a movement command for controlling movement of the robot to perform a robot operation, wherein the movement command is based on camera calibration information associated with the camera;

to receive an image representing the verification symbol, wherein the image is received from the camera via the communication interface, and is a verification image for verification of the camera calibration information;

to determine location information for the verification symbol in the verification image, wherein the location information indicates a location of the verification symbol in the verification image;

to determine, based on the location information for the verification symbol in the verification image, whether to update the camera calibration information, and in response to a determination to update the camera calibration information, to perform a camera calibration to determine updated camera calibration information.

2. The computing system of claim 1, wherein the camera calibration information used to output the movement command is determined based on a first camera calibration, and wherein the camera calibration that is performed in response to the determination to update the camera calibration information is a second camera calibration.

3. The computing system of claim 2, wherein the control circuit is further configured to receive, before the verification image is received, an additional image representing the verification symbol, wherein the additional image is received from the camera via the communication interface, and is a reference image for verification of the camera calibration information; and to determine location information for the verification symbol in the reference image, wherein the control circuit is configured to determine whether to update the camera calibration information based on deviation between the location information for the verification symbol in the reference image and the location information for the verification symbol in the verification image.

4. The computing system of claim 3, wherein the reference image is generated via the camera when the verification symbol is at a reference location of one or more reference locations used for verification of the camera calibration information, and wherein the control circuit is configured to output an additional movement command for controlling the robot to move the verification symbol to at least the reference location and to cause the verification image to be generated via the camera when the verification symbol is at the reference location.

5. The computing system of claim 4, where the control circuit is further configured to detect an idle period during the robot operation, and wherein the additional movement command for controlling the robot to move the verification symbol to at least the reference location is output during the idle period.

6. The computing system of claim 5, wherein the control circuit is configured to detect the idle period of the robot operation by detecting a time period during which the robot is free from performing a robot task during the robot operation.

7. The computing system of claim 4, wherein the one or more reference locations to which the control circuit is configured to cause the verification symbol to be moved via the robot includes a plurality of reference locations disposed on a surface of an imaginary sphere that is concave with respect to the camera.

8. The computing system of claim 7, wherein the control circuit is configured to cause the robot to move the verification symbol to be tangent to the surface of the imaginary sphere at each reference location of the plurality of reference locations.

9. The computing system of claim 3, wherein the location information for the verification symbol in the reference image is a coordinate at which the verification symbol appears in the reference image, the coordinate being a reference coordinate, wherein the location information for the verification symbol in the verification image is a coordinate at which the verification symbol appears in the verification image, the coordinate being a verification coordinate, and wherein the control circuit is configured to determine whether to update the camera calibration information based on deviation between the reference coordinate and the verification coordinate.

10. The computing system of claim 3, wherein the control circuit is configured to determine a deviation parameter value that is based on the deviation between the location information for the verification symbol in the reference image and the location information for the verification symbol in the verification image, wherein the control circuit is configured to determine to update the camera calibration information when the deviation parameter value exceeds a defined threshold, and wherein the deviation parameter value is indicative of a change in the camera since the first camera calibration or of a change in a relationship between the camera and the robot since the first camera calibration.

11. The computing system of claim 10, wherein the control circuit is further configured to determine a temperature of an environment in which the robot is located; and adjust at least one of the defined threshold or the camera calibration information based on the temperature that is determined.

12. The computing system of claim 1, wherein the verification symbol includes a first region having a first color and a second region having a second color, wherein a ratio of an area of the first region to an area of the second region is defined and stored as a defined ratio, and wherein the control circuit is configured to identify the verification symbol in the reference image or in the verification image based on the defined ratio.

13. The computing system of claim 1, wherein the movement command is a first movement command, wherein the control circuit is configured, in response to a determination not to update the camera calibration information, to output a second movement command for controlling the robot to continue the robot operation without performing additional camera calibration.

14. A method of performing camera calibration verification for robot control, the method comprising:

outputting a movement command by a computing system that comprises a communication interface configured to communicate with a robot having a verification symbol disposed thereon and to communicate with a camera, wherein the movement command is for controlling the robot to perform a robot operation, and is based on camera calibration information associated with the camera;

receiving, by the computing system and from the communication interface, an image representing the verification symbol, wherein the image is received from the camera via the communication interface, and is a verification image for verification of the camera calibration information;

determining, by the computing system, location information for the verification symbol in the verification image, wherein the location information indicates a location of the verification symbol in the verification image;

determining, by the computing system, based on the location information for the verification symbol in the verification image, whether to update the camera calibration information; and performing by the computing system, in response to a determination to update the camera calibration information, a camera calibration to determine updated camera calibration information.

15. The method of claim 14, wherein the camera calibration information used to output the movement command is determined based on a first camera calibration, and wherein the camera calibration that is performed in response to the determination to update the camera calibration information is a second camera calibration.

16. The method of claim 15, further comprising:

receiving, by the computing system before the verification image is received, an additional image representing the verification symbol, wherein the additional image is received from the camera via the communication interface, and is a reference image for verification of the camera calibration information; and determining, by the computing system, location information for the verification symbol in the reference image, wherein the computing system determines whether to update the camera calibration information based on deviation between the location information for the verification symbol in the reference image and the location information for the verification symbol in the verification image.

17. The method of claim 16, wherein the reference image is generated via the camera when the verification symbol is at a reference location of one or more reference locations used for verification of the camera calibration information, and wherein the method further comprises outputting, by the computing system, an additional movement command for controlling the robot to move the verification symbol to at least the reference location and to cause the verification image to be generated via the camera when the verification symbol is at the reference location.

18. The method of claim 17, wherein the method further comprises detecting, by the computing system, an idle period during the robot operation, and wherein the additional movement command for controlling the robot to move the verification symbol to at least the reference location is output during the idle period.

19. The method of claim 18, wherein the computing system detects the idle period of the robot operation by detecting a time period during which the robot is free from performing a robot task during the robot operation.

20. A non-transitory computer-readable medium having instructions stored thereon that, when executed by a control circuit of a computing system, causes the control circuit to output a movement command, wherein the computing system comprises a communication interface configured to communicate with a robot having a verification symbol disposed thereon and to communicate with a camera, wherein the movement command is for controlling the robot to perform a robot operation, and is based on camera calibration information associated with the camera;

to receive, from the communication interface, an image representing the verification symbol, wherein the image is received from the camera via the communication interface, and is a verification image for verification of the camera calibration information;

to determine location information for the verification symbol in the verification image, wherein the location information indicates a location of the verification symbol in the verification image;

to determine, based on the location information for the verification symbol in the verification image, whether to update the camera calibration information; and to perform, in response to a determination to update the camera calibration information, a camera calibration to determine updated camera calibration information.

* * * * *